(12) United States Patent　　　(10) Patent No.:　US 12,663,253 B2
Inoue et al.　　　　　　　　　　　(45) Date of Patent:　Jun. 23, 2026

(54) ALIGNMENT DIRECTION DETECTION DEVICE

(71) Applicant: Mitsubishi Electric Corporation, Tokyo (JP)

(72) Inventors: Jin Inoue, Tokyo (JP); Yoshimasa Watanabe, Tokyo (JP); Yasuyuki Okada, Tokyo (JP); Akira Hotta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 169 days.

(21) Appl. No.: 18/693,156

(22) PCT Filed: Sep. 24, 2021

(86) PCT No.: PCT/JP2021/035173
§ 371 (c)(1),
(2) Date: Mar. 19, 2024

(87) PCT Pub. No.: WO2023/047548
PCT Pub. Date: Mar. 30, 2023

(65) Prior Publication Data
US 2024/0288260 A1　　Aug. 29, 2024

(51) Int. Cl.
*G01B 7/31*　　(2006.01)
*G01D 5/20*　　(2006.01)

(52) U.S. Cl.
CPC .................. *G01B 7/31* (2013.01); *G01D 5/20* (2013.01)

(58) Field of Classification Search
CPC ............. G01B 7/31; G01D 5/20; G01N 27/72
See application file for complete search history.

(56) References Cited

U.S. PATENT DOCUMENTS

2007/0299625 A1* 12/2007 Englert .................. G01B 7/003
　　　　　　　　　　　　　　　　　324/207.11
2012/0126803 A1* 5/2012 Goldfine ................ G01N 27/90
　　　　　　　　　　　　　　　　　324/239
(Continued)

FOREIGN PATENT DOCUMENTS

JP　　S61-151402 A　　7/1986
JP　　2007-121050 A　　5/2007
(Continued)

OTHER PUBLICATIONS

International Search Report and Written Opinion mailed on Nov. 16, 2021, received for International Patent Application No. PCT/JP2021/035173, filed on Sep. 24, 2021, 11 pages including English Translation.

*Primary Examiner* — Akm Zakaria
(74) *Attorney, Agent, or Firm* — XSENSUS LLP

(57)　　　　　　ABSTRACT
An alignment direction detection device includes an excitation coil to apply an AC magnetic field to a test object; one or more magnetic field sensors, each of which detects an inductive magnetic field caused by the AC magnetic field; a conveyance device; and processing circuitry. The processing circuitry performs band limitation on a distribution of the voltage outputted from each magnetic field sensor included in the one or more magnetic field sensors based on a radial direction space frequency corresponding to a size of the magnetic field sensor and a distance between the magnetic field sensor and the test object, transforms the band-limited voltage distribution into an output intensity waveform with respect to a space angle at the radial direction space frequency, and calculates a peak angle that is a peak position of the waveform as an alignment angle representing the alignment direction.

20 Claims, 17 Drawing Sheets

(56) References Cited

U.S. PATENT DOCUMENTS

| | | | | |
|---|---|---|---|---|
| 2013/0259347 A1* | 10/2013 | Schmitt | ................. | A61B 6/032 |
| | | | | 382/131 |
| 2019/0079054 A1 | 3/2019 | Tsuda et al. | | |
| 2020/0088685 A1 | 3/2020 | Heuer et al. | | |
| 2022/0244323 A9* | 8/2022 | Ellis, Jr. | ............... | G01R 33/072 |

FOREIGN PATENT DOCUMENTS

| | | | |
|---|---|---|---|
| JP | 2008-102073 A | | 5/2008 |
| JP | 2008-122178 A | | 5/2008 |
| JP | 2016-205902 A | | 12/2016 |
| JP | 2017-072536 A | | 4/2017 |
| JP | 2019-045322 A | | 3/2019 |
| JP | 2020139747 A | * | 9/2020 |

* cited by examiner

Figure 15:
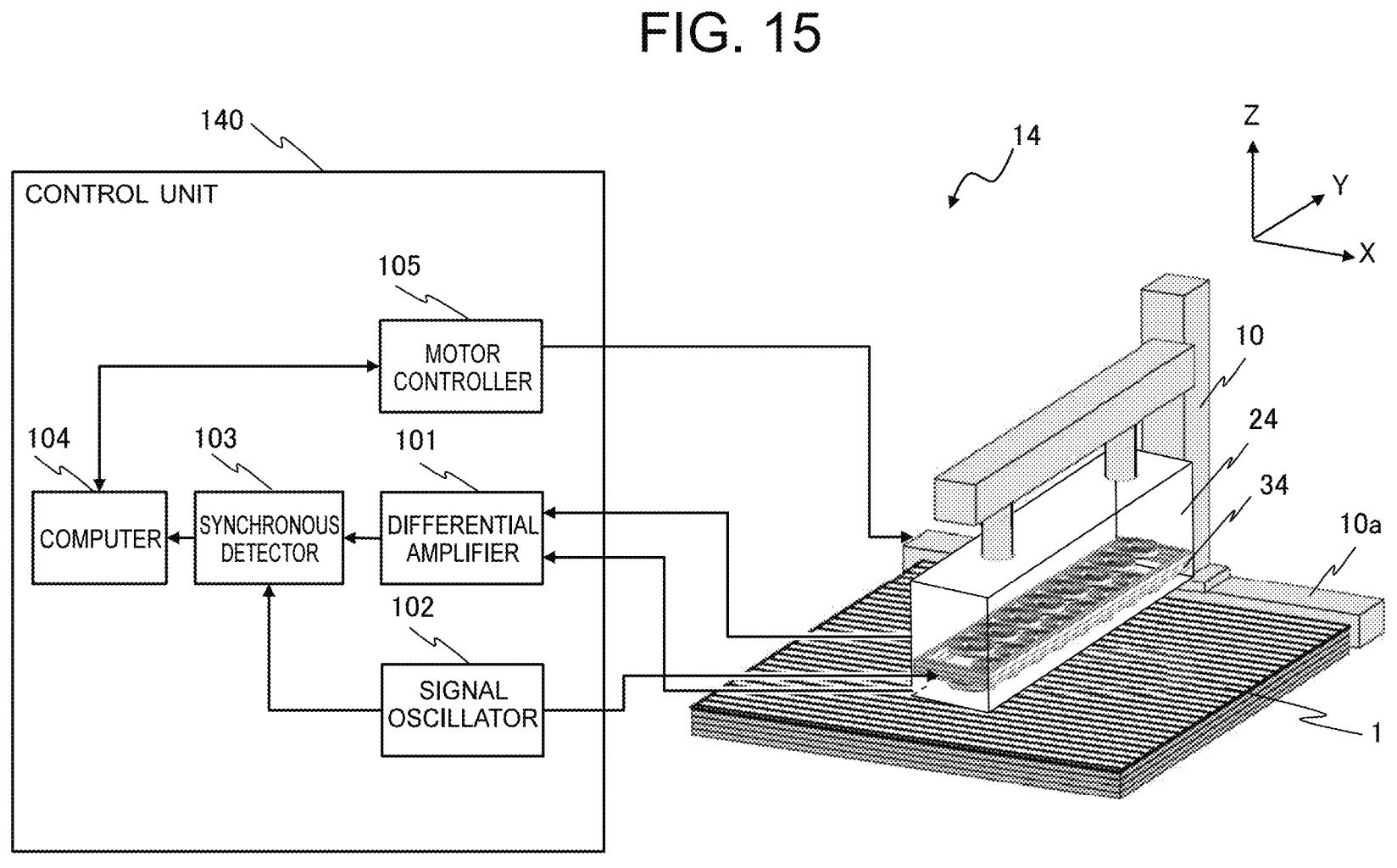

CONTROL UNIT

140

105 — MOTOR CONTROLLER

101 — DIFFERENTIAL AMPLIFIER

102 — SIGNAL OSCILLATOR

103 — SYNCHRONOUS DETECTOR

104 — COMPUTER

14

10
24
34

10
10a
1

Z
Y
X

1

ALIGNMENT DIRECTION DETECTION DEVICE

CROSS-REFERENCE TO RELATED APPLICATION

This application is a national stage application, pursuant to 35 U.S.C. § 371, of International Patent Application No. PCT/JP2021/035173, filed Sep. 24, 2021, the entire contents of which are incorporated herein by reference.

TECHNICAL FIELD

The present disclosure relates to an alignment direction detection device that detects an alignment direction of fibers in a test object including an electrically conductive composite material.

BACKGROUND ART

In carbon fiber reinforced plastic (CFRP) as an electrically conductive composite material containing electrically conductive fibers, misalignment as a deviation in a macroscopic or local alignment direction of the fibers in each layer from a design value can occur in a process of stacking a plurality of prepregs each being a fiber sheet made by impregnating carbon fiber woven cloth with resin. Patent Reference 1 discloses a detection device that detects a part with disordered alignment of fibers in an electrically conductive composite material.

PRIOR ART REFERENCE

Patent Reference

Patent Reference 1: Japanese Patent Application Publication No. 2017-72536

SUMMARY OF THE INVENTION

Problem to be Solved by the Invention

The aforementioned conventional device detects a part with disordered alignment of fibers in an electrically conductive composite material by measuring the magnetic field by a magnetic field sensor, however, it is difficult to quantitatively obtain an angle representing the deviation in the fiber alignment.

An object of the present disclosure, which has been made to resolve the above-described problem, is to provide an alignment direction detection device capable of quantitatively detecting an angle representing the fiber alignment direction of a test object including an electrically conductive composite material.

Means for Solving the Problem

An alignment direction detection device according to the present disclosure is a device that detects an alignment direction of fibers in a test object including one or more sheets of electrically conductive composite materials each containing electrically conductive fibers. The alignment direction detection device includes an excitation coil to apply an AC magnetic field to the test object; one or more magnetic field sensors arranged at positions maintaining a fixed positional relationship with the excitation coil, each of which detects an inductive magnetic field caused by the AC magnetic field and outputs voltage corresponding to the inductive magnetic field; a conveyance device to move at least one of the test object and a sensor unit including the excitation coil and the one or more magnetic field sensors; and a control unit to control the excitation coil, the one or more magnetic field sensors and the conveyance device. The control unit performs band limitation on a distribution of the voltage outputted from each magnetic field sensor included in the one or more magnetic field sensors based on a radial direction space frequency corresponding to a size of the magnetic field sensor and a distance between the magnetic field sensor and the test object, transforms the band-limited voltage distribution into an output intensity waveform with respect to a space angle at the radial direction space frequency, and calculates a peak angle that is a peak position of the waveform as an alignment angle representing the alignment direction.

Effect of the Invention

According to the present disclosure, it is possible to quantitatively detect the angle representing the fiber alignment direction of the test object including an electrically conductive composite material.

BRIEF DESCRIPTION OF THE DRAWINGS

FIGS. 2A and 2B are a perspective view and an exploded view schematically showing the structure of a laminated body of electrically conductive composite materials.

FIG. 15 is a diagram showing the configuration of an alignment direction detection device according to a fourth embodiment.

MODE FOR CARRYING OUT THE INVENTION

Figure 1:
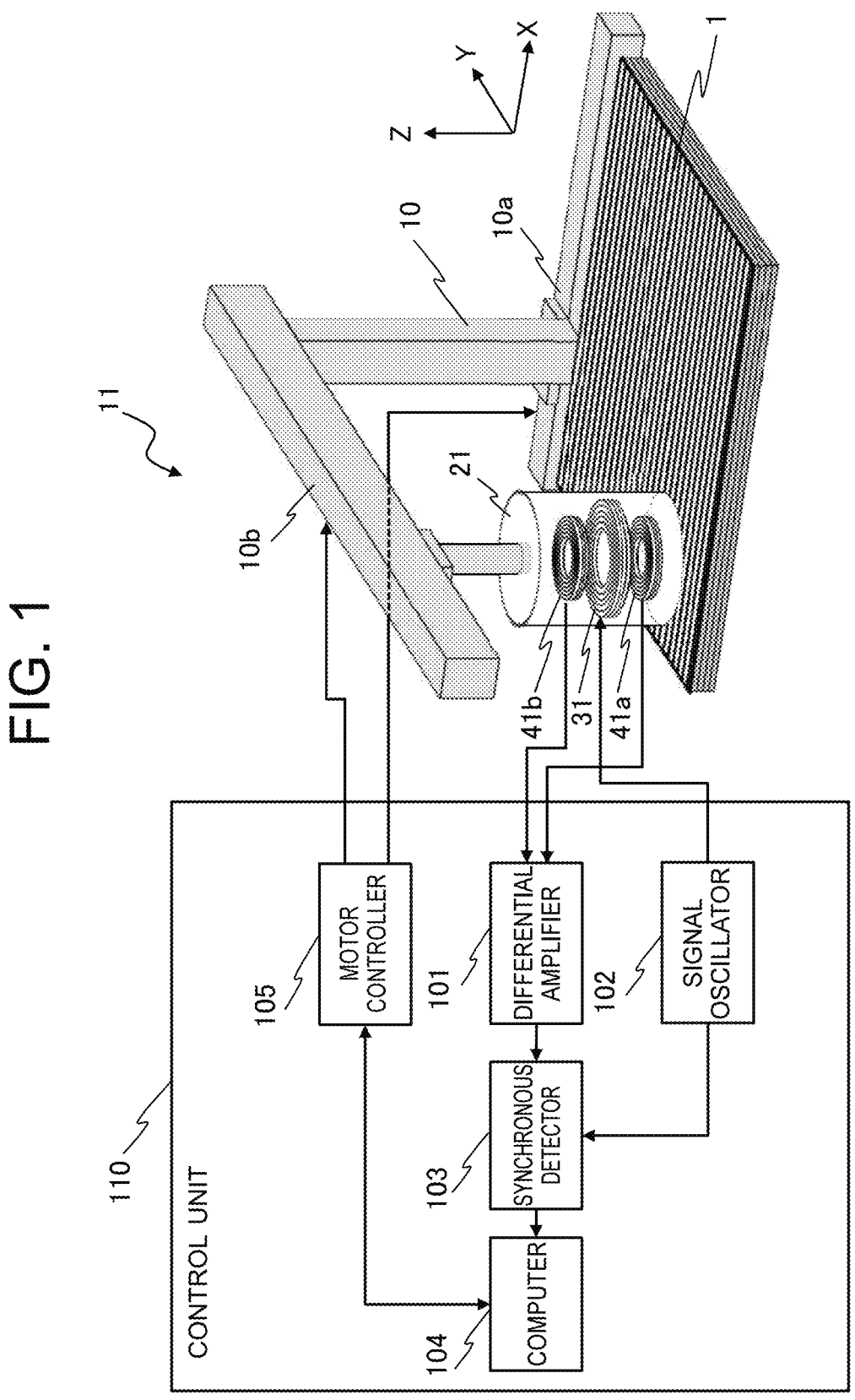
FIG. 1 is a diagram showing the configuration of an alignment direction detection device according to a first embodiment.

An alignment direction detection device according to each embodiment will be described below with reference to the drawings. The alignment direction detection device is a device that detects the alignment direction of fibers in a test object including one or more sheets of electrically conductive composite materials each containing electrically conductive fibers. The following embodiments are just examples and it is possible to appropriately combine embodiments and appropriately modify each embodiment.

Coordinate axes of an XYZ orthogonal coordinate system are shown in the drawings. An X-axis and a Y-axis are coordinate axes respectively in an X direction (i.e., first or second direction) and a Y direction (i.e., second or first direction) parallel to a surface of the test object (i.e., the electrically conductive composite material forming the test object). A Z-axis is a coordinate axis in a Z direction that represents a distance from the test object (i.e., lift-off). The Z direction is a direction in which a plurality of electrically conductive composite materials are stacked up.

First Embodiment

FIG. 1 is a diagram showing the configuration of an alignment direction detection device 11 according to a first embodiment. The alignment direction detection device 11 is a device that detects the alignment direction of electrically conductive fibers in the test object including one or more sheets of electrically conductive composite materials each containing electrically conductive fibers. In FIG. 1, the test object is a laminated body 1 made by stacking a plurality of electrically conductive composite materials (e.g., fiber sheets). The alignment direction is a direction in which the fibers extend.

The alignment direction detection device 11 is arranged to face the surface of the laminated body 1, and includes an excitation coil 31 that applies an AC magnetic field to the laminated body 1 and a detection coil 41a (referred to also as a "first magnetic field sensor") and a detection coil 41b (referred to also as a "second magnetic field sensor") as one or more magnetic field sensors arranged at positions maintaining a fixed positional relationship with the excitation coil 31 and so as to face the laminated body 1, each of which detects an inductive magnetic field caused by the AC magnetic field and outputs voltage corresponding to the inductive magnetic field. Further, the alignment direction detection device 11 includes a conveyance device 10 that moves at least one of the laminated body 1 as the test object and a probe 21 as a sensor unit including the excitation coil 31 and the detection coils 41a and 41b. Furthermore, the alignment direction detection device 11 includes a control unit 110 that controls the excitation coil 31, the detection coils 41a and 41b, and the conveyance device 10.

The conveyance device 10 includes an X direction conveyance unit 10a as a mechanism that moves the probe 21 including the excitation coil 31 and the detection coils 41a and 41b in the X direction and a Y direction conveyance unit 10b as a mechanism that moves the probe 21 in the Y direction. Conveyance directions of the X direction conveyance unit 10a and the Y direction conveyance unit 10b do not necessarily have to be orthogonal to each other as long as the directions cross each other. One of the X direction conveyance unit 10a and the Y direction conveyance unit 10b is referred to also as a first conveyance unit, and the other is referred to also as a second conveyance unit.

The control unit 110 performs band limitation on a distribution of the voltage outputted from the detection coil 41a, 41b based on a radial direction space frequency corresponding to the size of the detection coil 41a, 41b (e.g., a diameter of a circular coil or a short side length of a rectangular coil) and the distance between the detection coil 41a, 41b and the electrically conductive composite material (steps ST1 to ST3 in FIG. 8 which will be explained later). The radial direction is a diametrical direction in cases where the detection coil 41a, 41b is a circular coil and is a short side direction in cases where the detection coil 41a, 41b is a rectangular coil. Further, the control unit 110 transforms the band-limited voltage distribution into an output intensity waveform with respect to a space angle at the radial direction space frequency (step ST4 in FIG. 8 which will be explained later), and calculates a peak angle that is a peak position of this waveform as an alignment angle θ representing the alignment direction (step ST5 in FIG. 8 which will be explained later).

The control unit 110 is formed by processing circuitry, for example. The processing circuitry may include a program stored in a memory and a CPU (Central Processing Unit) as a processor that executes the program. In the example of FIG. 1, the control unit 110 includes a differential amplifier 101, a signal oscillator 102, a synchronous detector 103, a computer 104 as an information processing device, and a motor controller 105. The configuration of the control unit 110 is not limited to that shown in FIG. 1.

In the example of FIG. 1, the probe 21 connected to the X direction conveyance unit 10a and the Y direction conveyance unit 10b is arranged over the surface of the laminated body 1 of the electrically conductive composite materials. Inside the probe 21, the excitation coil 31, the detection coil 41a (referred to also as a "first detection coil") and the detection coil 41b (referred to also as a "second detection coil") are arranged on the same winding axis. The excitation coil 31 is connected to the signal oscillator 102. The detection coils 41a and 41b are connected to the differential amplifier 101. The detection coil 41a is arranged at a position closer to the laminated body 1 as the test object compared to the detection coil 41b. The detection coil 41a is arranged at a position closer to the laminated body 1 compared to the excitation coil 31, and the detection coil 41b is arranged at a position farther from the laminated body 1 compared to the excitation coil 31. The differential amplifier 101 and the signal oscillator 102 are connected to the synchronous detector 103. The signal oscillator 102 is connected to the computer 104.

Further, the X direction conveyance unit 10a and the Y direction conveyance unit 10b include a drive mechanism including a motor as a drive force generation unit and gears or the like as a drive force transmission unit, and the motor is controlled by the motor controller 105. The motor controller 105 controls the operation of the X direction conveyance unit 10a and the Y direction conveyance unit 10b based on a command from the computer 104.

The excitation coil 31 receives high-frequency voltage (or high-frequency current) outputted from the signal oscillator 102 and applies the AC magnetic field (referred to also as a "high-frequency magnetic field" or an "excitation magnetic field") to the laminated body 1 of the electrically conductive composite materials. In the electrically conductive composite materials to which the excitation magnetic field is applied (e.g., on the surface, inside, etc.), inductive current flows according to the law of electromagnetic induction.

Figures 2A, 2B:
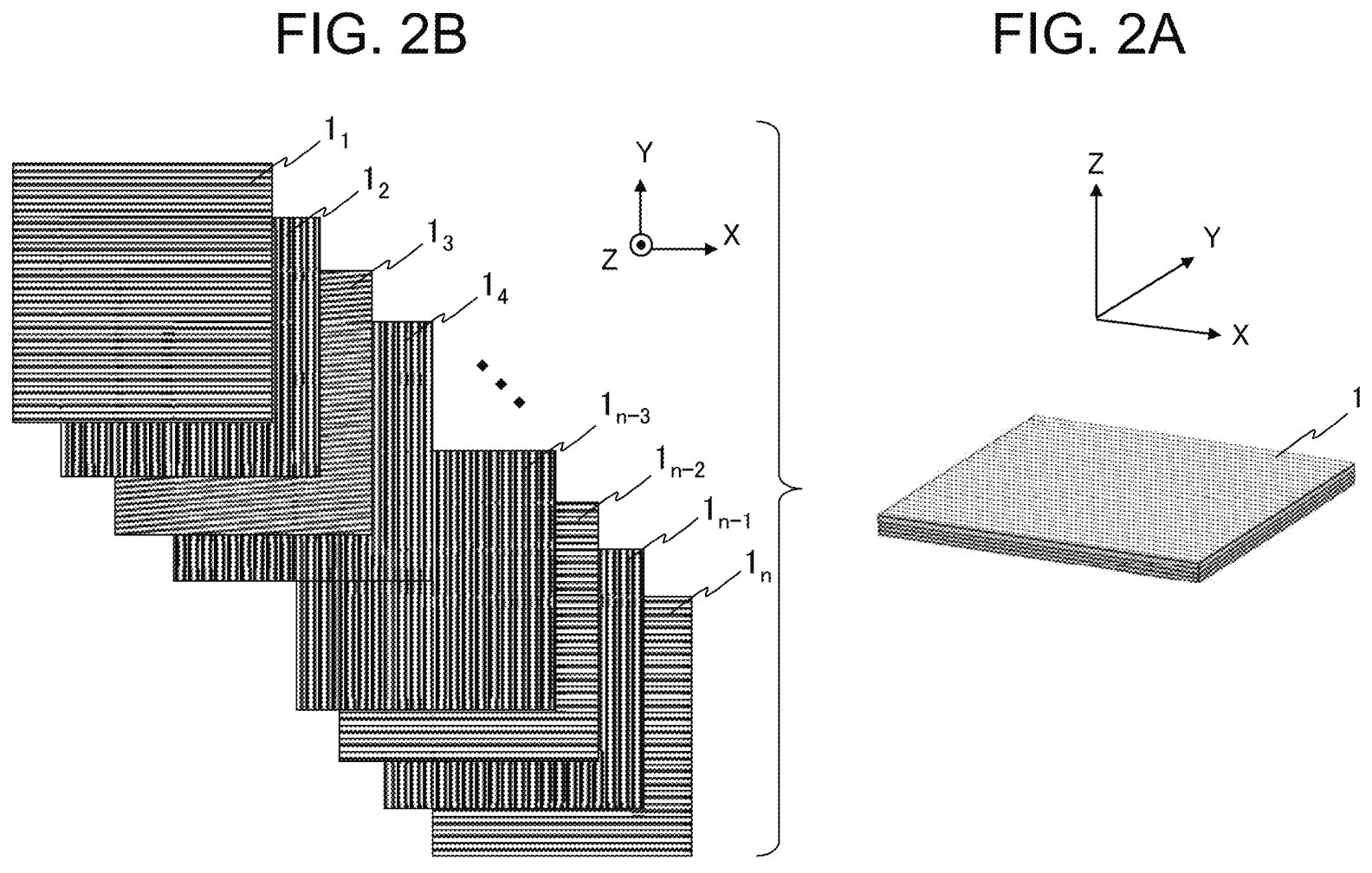

FIGS. 2A and 2B are a perspective view and an exploded view schematically showing the structure of the laminated body 1 of the electrically conductive composite materials. FIG. 2A shows the external appearance of the laminated body 1 of the electrically conductive composite materials. FIG. 2B shows a plurality of prepregs in which each electrically conductive composite material is carbon fiber (referred to also as "carbon composite fiber"). Each prepreg is a fiber sheet made by impregnating carbon fiber woven cloth with resin (e.g., thermosetting resin or thermoplastic resin). In this case, the electrically conductive composite material is carbon fiber reinforced plastic. FIG. 2B shows the laminated body 1 formed by successively stacking n layers of prepregs including prepregs whose alignment direction is the X direction and prepregs whose alignment direction is the Y direction. In the example of FIG. 2B, the laminated body 1 formed by stacking n layers (e.g., n is an integer greater than or equal to 4) of prepregs is shown. In the example of FIG. 2B, only a layer $1_3$ has an alignment direction deviated by 5° From the X direction as a reference direction. In this case, in odd number layers such as a layer $1_1$, the layer $1_3$, etc. (namely, layers $1_{2m+1}$ as the (2m+1)-th layers (m: integer greater than or equal to 0)), the inductive current flows in a transverse direction in FIG. 2B (i.e., the X direction) (however, in the layer $1_3$, the inductive current flows in a direction inclined by 5° with respect to the X direction), and hardly flows in an up/down direction in FIG. 2B (i.e., the Y direction). In even number layers such as a layer $1_2$, a layer $1_4$, etc. (namely, layers $1_{2m+2}$ as the (2m+2)-th layers (m: integer greater than or equal to 0)), the inductive current flows in the up/down direction (hardly flows in the transverse direction). The inductive magnetic field is caused by the inductive current occurring in each layer of the laminated body 1. The inductive magnetic field is detected by the detection coil 41a, 41b, and the voltage corresponding to the inductive magnetic field is outputted from the detection coil 41a, 41b.

Figure 3:
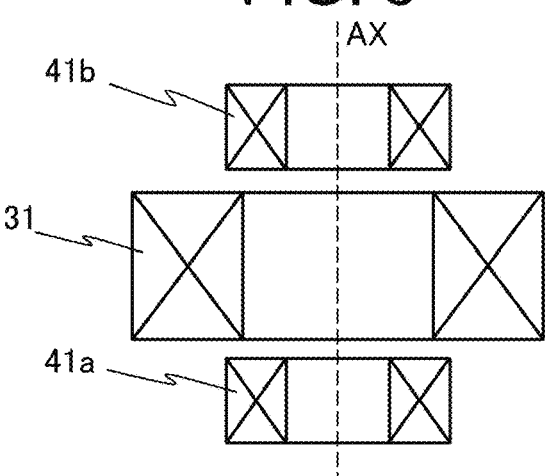
FIG. 3 is a cross-sectional view schematically showing an example of an excitation coil and detection coils in a probe of the alignment direction detection device according to the first embodiment.
Figure 3:
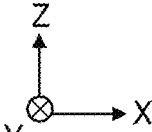

FIG. 3 is a cross-sectional view schematically showing an example of the excitation coil 31 and the detection coils 41a and 41b in the probe 21 of the alignment direction detection device 11. FIG. 3 shows cross-sectional shapes of the excitation coil 31 and the detection coils 41a and 41b centering at the winding axis Ax. The detection coils 41a and 41b are arranged on the same winding axis as (i.e., coaxially with) the excitation coil 31 and at positions equidistant from the excitation coil 31. Thus, by making the differential amplifier 101 take the difference between the output voltages of the detection coils 41a and 41b, an inductive current component can be obtained without being affected by the AC magnetic field from the excitation coil 31. The detection coils 41a and 41b constitute a differential coil that outputs the difference between voltage outputs of two coils having the same structure.

The arrangement of the excitation coil 31 and the detection coils 41a and 41b is not limited to the arrangement in FIG. 3 as long as the excitation coil 31 and the detection coils 41a and 41b are arranged on the same winding axis Ax and the distance from the excitation coil 31 to the detection coil 41a and the distance from the excitation coil 31 to the detection coil 41b are equal to each other.

Figure 4:
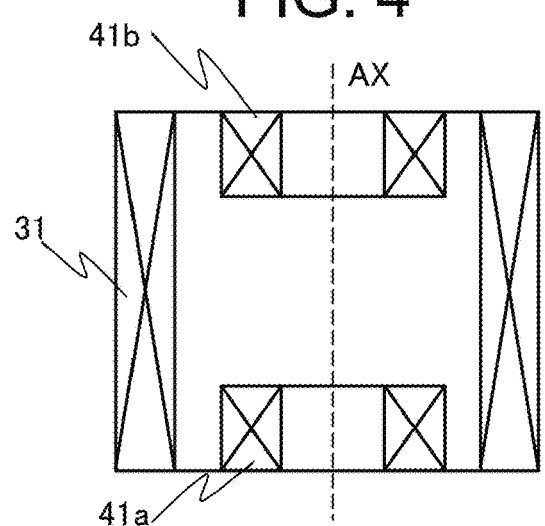
FIG. 4 is a cross-sectional view schematically showing another example of the excitation coil and the detection coils in the probe of the alignment direction detection device according to the first embodiment.
Figure 4:
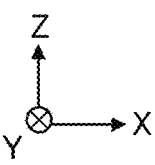

FIG. 4 is a cross-sectional view schematically showing another example of the excitation coil 31 and the detection coils 41a and 41b in the probe 21 of the alignment direction detection device 11. As shown in FIG. 4, the excitation coil 31 and the detection coils 41a and 41b in the probe 21 may also be arranged by arranging the detection coils 41a and 41b inside the excitation coil 31.

Figure 5:
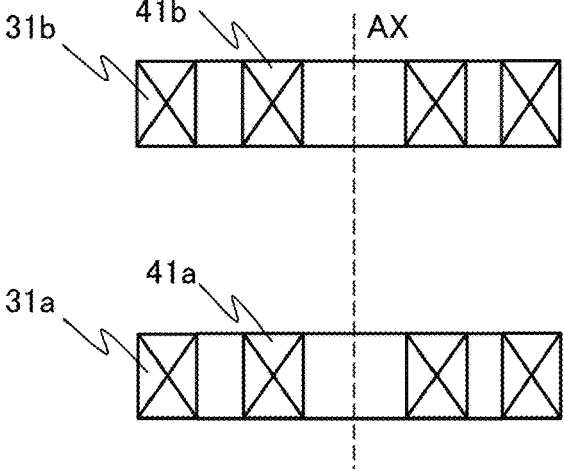
FIG. 5 is a cross-sectional view schematically showing another example of the excitation coil and the detection coils in the probe of the alignment direction detection device according to the first embodiment.
Figure 5:
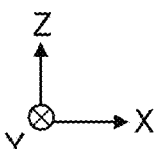

FIG. 5 is a cross-sectional view schematically showing another example of the excitation coils 31a, 31b and the detection coils 41a and 41b in the probe 21 of the alignment direction detection device 11. As shown in FIG. 5, the probe 21 may include two excitation coils: an excitation coil 31a (referred to also as a "first excitation coil") and an excitation coil 31b (referred to also as a "second excitation coil"), as the excitation coil, and the detection coils 41a and 41b as the magnetic field sensors. In this case, the excitation coil includes the excitation coil 31a and the excitation coil 31b arranged at a position farther from the laminated body 1 compared to the excitation coil 31a. Further, the detection coil 41a is arranged inside the excitation coil 31a, and the detection coil 41b is arranged inside the excitation coil 31b.

It is also possible to amplify the sensitivity by arranging a magnetic material such as ferrite or electromagnetic steel sheets inside each coil (e.g., the excitation coil 31, 31a, 31b, the detection coil 41a, 41b). Further, as the magnetic field sensor for detecting the inductive magnetic field, a detection sensor such as a magnetoresistance element sensor (e.g., an anisotropic magnetoresistance (AMR) sensor, a giant magnetoresistance (GMR) sensor or a tunnel magnetoresistance (TMR) sensor), a magnetic impedance (MI) sensor, a Hall sensor, a flux gate (FG) sensor, a magnetooptic (MO) sensor, an optical pumping atomic magnetic sensor or a superconducting quantum interference device (SQUID) may be used instead of the detection coil 41a, 41b.

The synchronous detector 103 receives a high-frequency signal deriving from the inductive magnetic field and acquired by the detection coils 41a and 41b and a synchronization signal (having a frequency equal to the frequency of the excitation magnetic field) outputted from the signal oscillator 102, performs synchronous detection, and thereby derives an I signal (=A cos Φ) and a Q signal (=A sin Φ) each made up of an amplitude value A of the high-frequency signal and a phase difference Φ with respect to the excitation magnetic field. Values of the derived I signal and Q signal are transmitted to the computer 104 and used for a process of detecting the alignment angle θ.

Figure 6:
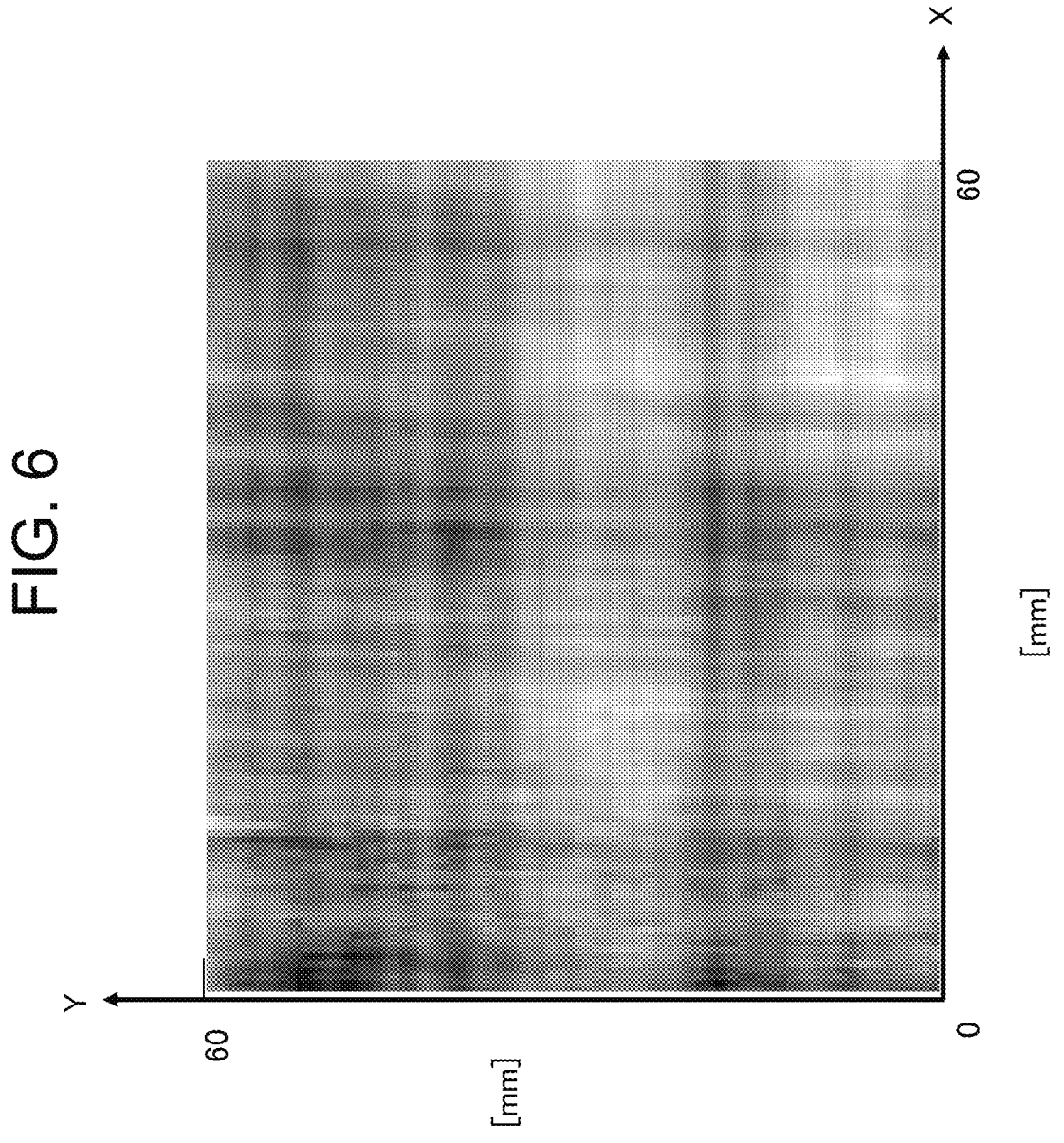
FIG. 6 is a contour diagram showing an intensity distribution of an I signal, as an output after a detection process of the alignment direction detection device according to the first embodiment, in terms of XY coordinates.
Figure 7:
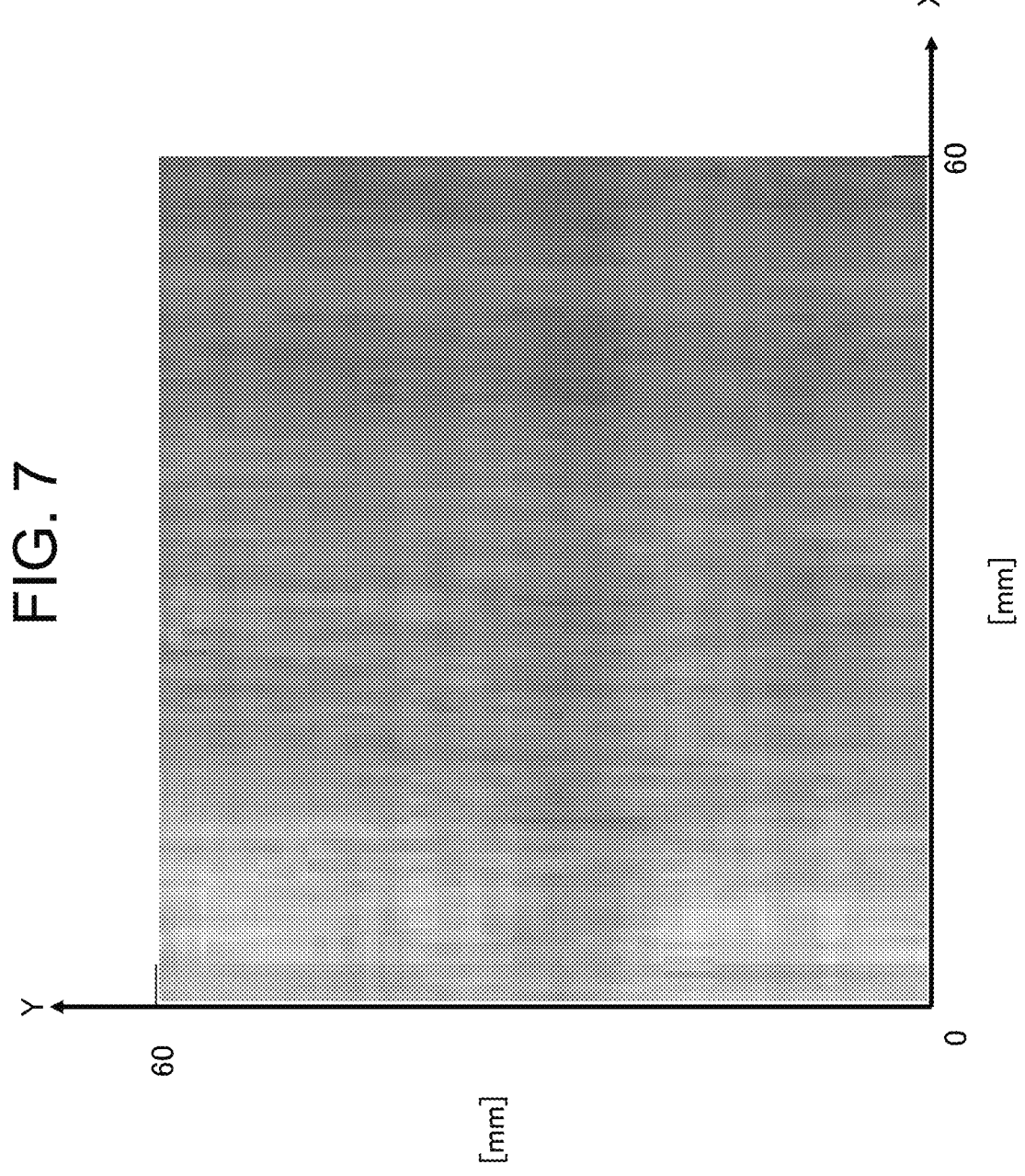
FIG. 7 is a contour diagram showing an intensity distribution of a Q signal, as an output after the detection process of the alignment direction detection device according to the first embodiment, in terms of XY coordinates.

FIG. 6 is a contour diagram showing an intensity distribution of the I signal, as an output after the detection process by the synchronous detector 103 of the alignment direction detection device 11, in terms of XY coordinates. FIG. 7 is a contour diagram showing an intensity distribution of the Q signal, as an output after the detection process by the synchronous detector 103 of the alignment direction detection device 11, in terms of XY coordinates. FIG. 6 and FIG. 7 show the intensity distribution of the I signal (FIG. 6) and the intensity distribution of the Q signal (FIG. 7) obtained when the surface of the laminated body 1 of the electrically conductive composite materials is two-dimensionally scanned by the probe 21 by driving the X direction conveyance unit 10a and the Y direction conveyance unit 10b through the motor controller 105 according to a command from the computer 104.

Figure 8:
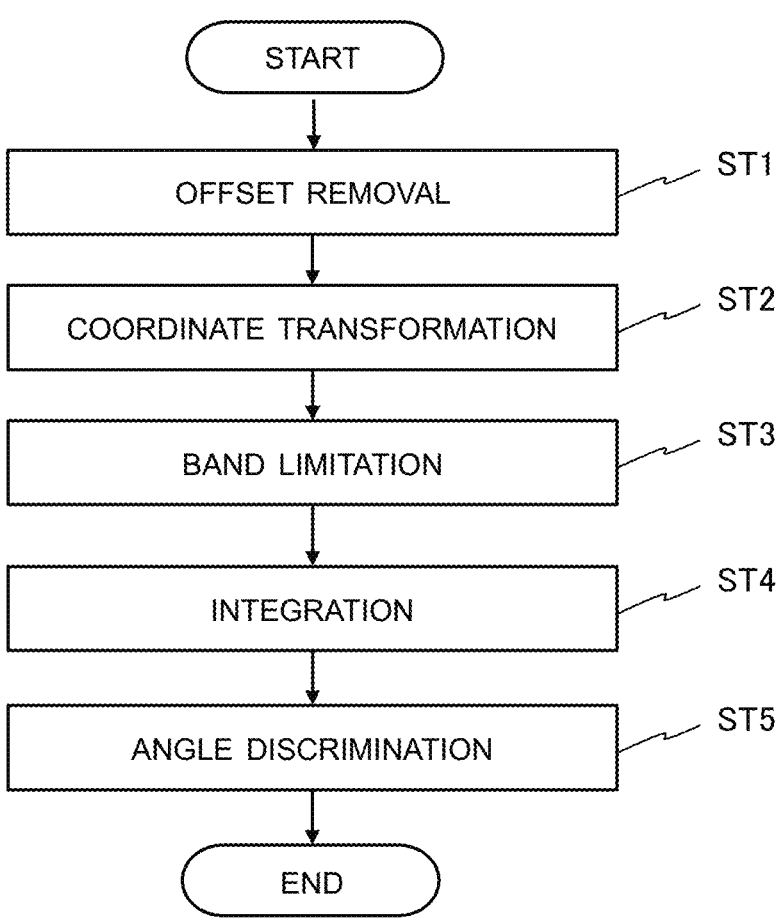
FIG. 8 is a flowchart showing signal processing executed by the alignment direction detection device according to the first embodiment.

FIG. 8 is a flowchart showing a procedure of detecting the alignment angle θ based on the intensity distribution of the I signal and the intensity distribution of the Q signal. First, in step ST1 in FIG. 8, the computer 104 performs an offset removal process on the acquired I signal and Q signal. The phase difference ¢ as a component forming the acquired I signal and Q signal includes not only a "phase characteristic of each measuring instrument" but also a phase fluctuation characteristic due to factors such as "electrical conductivity of the laminated body 1 of the electrically conductive composite materials", "electrical properties of the excitation coil 31 and the detection coils 41a and 41b", "lift-off as the distance between the probe 21 and the laminated body 1 of the electrically conductive composite materials" and the "frequency of the excitation magnetic field". While the phase fluctuation characteristic can be regarded as a fixed constant in measurement under the same condition, a signal component indicating the alignment of the fibers in the laminated body 1 diverges into the I signal and the Q signal due to the phase fluctuation characteristic. Therefore, in the offset removal process in the step ST1, an I' signal (=AcosΦ', (Φ'=Φ+Φ₀)) from which the phase fluctuation characteristic has been removed is derived by adding a constant value do to the phase difference Φ in the I signal and the Q signal.

In the next step ST2, a coordinate transformation process is executed. In the coordinate transformation process in the step ST2, a Fourier transform process and a coordinate transformation process from the XY coordinate system to a cylindrical coordinate system are performed on the intensity distribution of the I' signal. That is, the computer 104 executes a process of transforming an output distribution on the surface of the laminated body 1 of the electrically conductive composite materials acquired by the detection coils 41a and 41b as the magnetic field sensors into an output intensity waveform with respect to the alignment angle θ (e.g., Radon transform).

Figure 9:
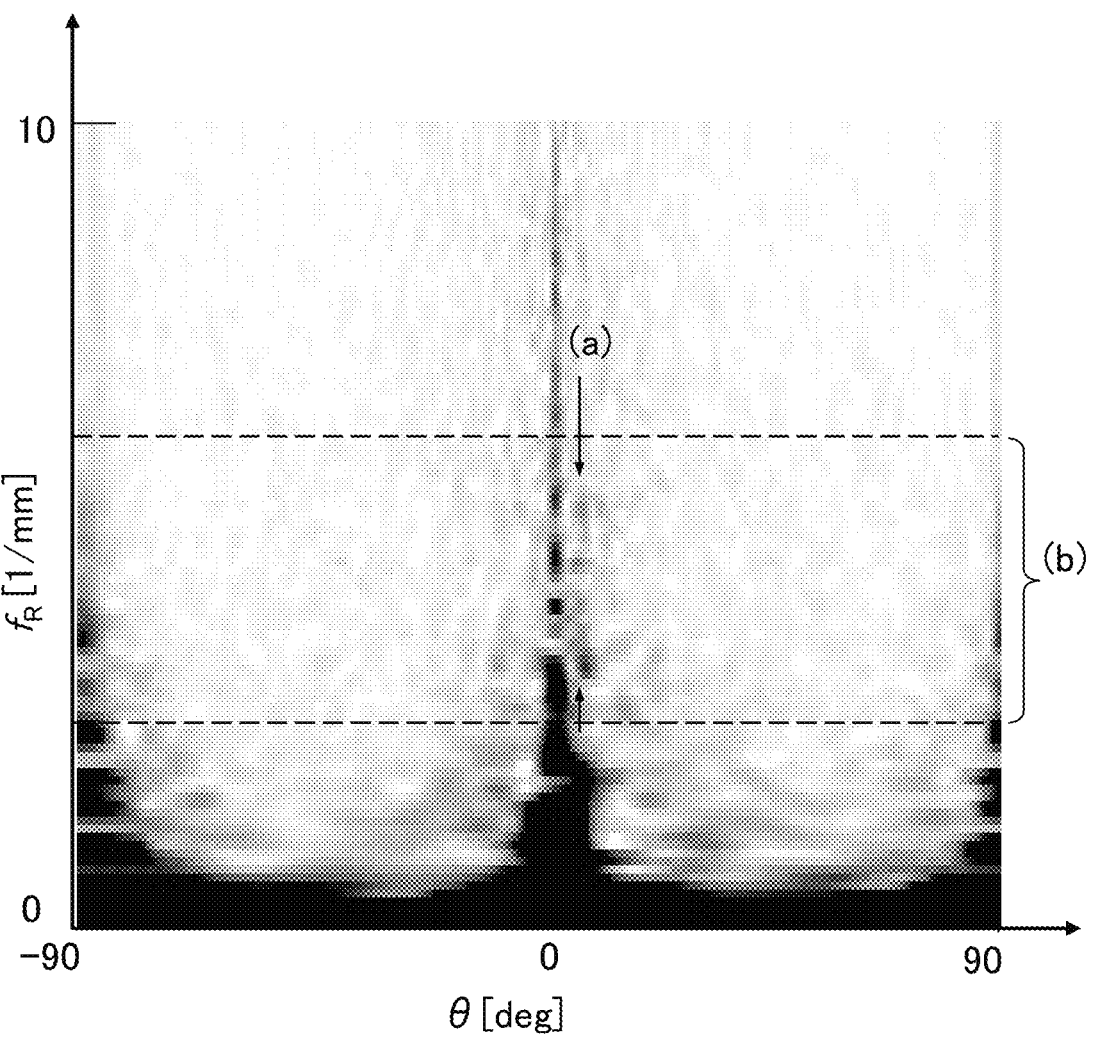
FIG. 9 is a contour diagram showing an output distribution after the detection process of the alignment direction detection device according to the first embodiment in terms of cylindrical coordinates.

FIG. 9 is a contour diagram showing the output distribution after the detection process of the alignment direction detection device 11 in terms of cylindrical coordinates. The contour diagram of FIG. 9 indicates the intensity distribution of the I' signal when the horizontal axis represents the alignment angle θ as the angle of the cylindrical coordinates and the vertical axis represents the radial direction space frequency $f_R$. In the diagram, the intensity is higher in regions having higher density. Focusing on the region (b) in FIG. 9, it can be seen that the intensity value is high at θ=0°, ±90° respectively representing the transverse direction (the X direction, the direction of 0=0°) and the up/down direction (the Y direction, the direction of 0=)+90° of the laminated body 1 of the electrically conductive composite materials in FIG. 2. Further, focusing on the arrow (a) in FIG. 9, it can be seen that the intensity is high at the position of 5° equal to the angle of the layer 1₃ (the layer whose alignment direction is deviated by 5° from the transverse direction) of the laminated body 1 of the electrically conductive composite materials in FIG. 2.

Figure 10:
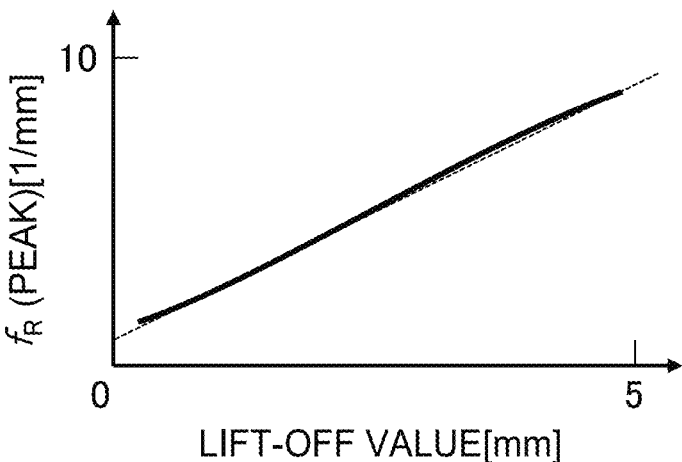
FIG. 10 is a graph showing a relationship between lift-off of the probe of the alignment direction detection device according to the first embodiment and a radial direction space frequency $f_R$ at a peak representing the alignment direction.
Figure 11:
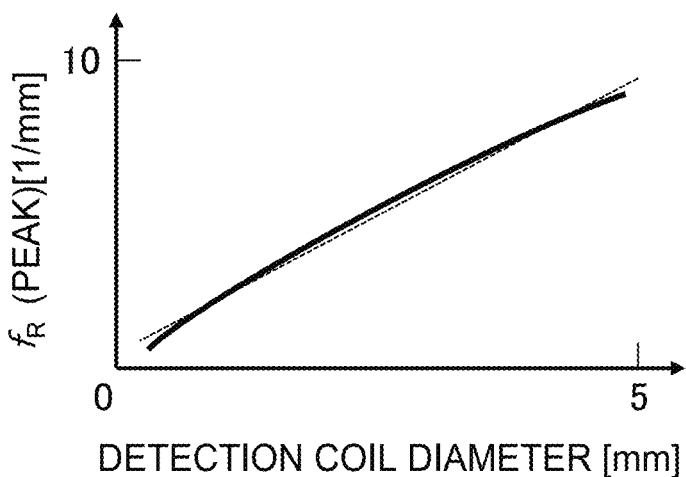
FIG. 11 is a graph showing a relationship between a diameter of the detection coil of the probe of the alignment direction detection device according to the first embodiment and the radial direction space frequency $f_R$ at the peak representing the alignment direction.

FIG. 10 is a graph showing a relationship between the lift-off [mm] of the probe 21 of the alignment direction detection device 11 and the radial direction space frequency $f_R$ [1/mm] at the peak representing the alignment direction. FIG. 11 is a graph showing a relationship between the diameter [mm] of the detection coil 41a, 41b of the probe 21 of the alignment direction detection device 11 and the radial direction space frequency $f_R$ [1/mm] at the peak representing the alignment direction. In FIG. 10, the radial direction space frequency $f_R$ when the intensity at θ=5° hits the maximum is represented as $f_R$ (PEAK) [1/mm], and its relationship with the lift-off [mm] between the probe 21 and the laminated body 1 of the electrically conductive composite materials is shown. In FIG. 11, the radial direction space frequency $f_R$ when the intensity at θ=5° hits the maximum is represented as $f_R$ (PEAK) [1/mm], and its relationship with the diameter [mm] of the detection coil in the probe 21 is shown. It can be seen from FIG. 10 and FIG. 11 that $f_R$ (PEAK) [1/mm] increases with the increase in the lift-off [mm] of the probe 21 and increases with the increase in the diameter [mm] of the detection coil 41a, 41b.

Further, while the shape of the detection coil 41a, 41b is assumed to be a circular shape and the horizontal axis represents the diameter [mm] in FIG. 11, also when the shape of the detection coil 41a, 41b is a rectangular shape and the horizontal axis represents the short side length of the detection coil, $f_R$ (PEAK) similarly increases with the increase in the short side length. Furthermore, when the excitation coil 31 is smaller than the detection coil 41a, 41b, the size of the excitation coil 31 (the diameter when the shape is a circular shape, the short side length when the shape is a rectangular shape) and $f_R$ (PEAK) [1/mm] have the same relationship. That is, similarly to the case shown in FIG. 11, $f_R$ (PEAK) [1/mm] increases with the increase in the diameter [mm] of the excitation coil 31.

In step ST3 in FIG. 8, the computer 104 performs the band limitation process on the processing result of the coordinate transformation process. In step ST3, the computer 104 executes the band limitation process based on FIG. 10 and FIG. 11, and executes an $f_R$ (PEAK) extraction process (e.g., extraction of the peak angle as the angle of (a) in FIG. 9). Further, since the sum of the size of the excitation coil 31 (the diameter when the shape is a circular shape, the short side length when the shape is a rectangular shape) and the lift-off also has the same relationship with $f_R$ (PEAK), the computer 104 may also execute the band limitation process based on the sum. For example, a passband in the band limitation can be set at a band of the radial direction space frequency proportional to the sum of the size of each detection coil and the distance between each detection coil and the laminated body 1.

Figure 12:
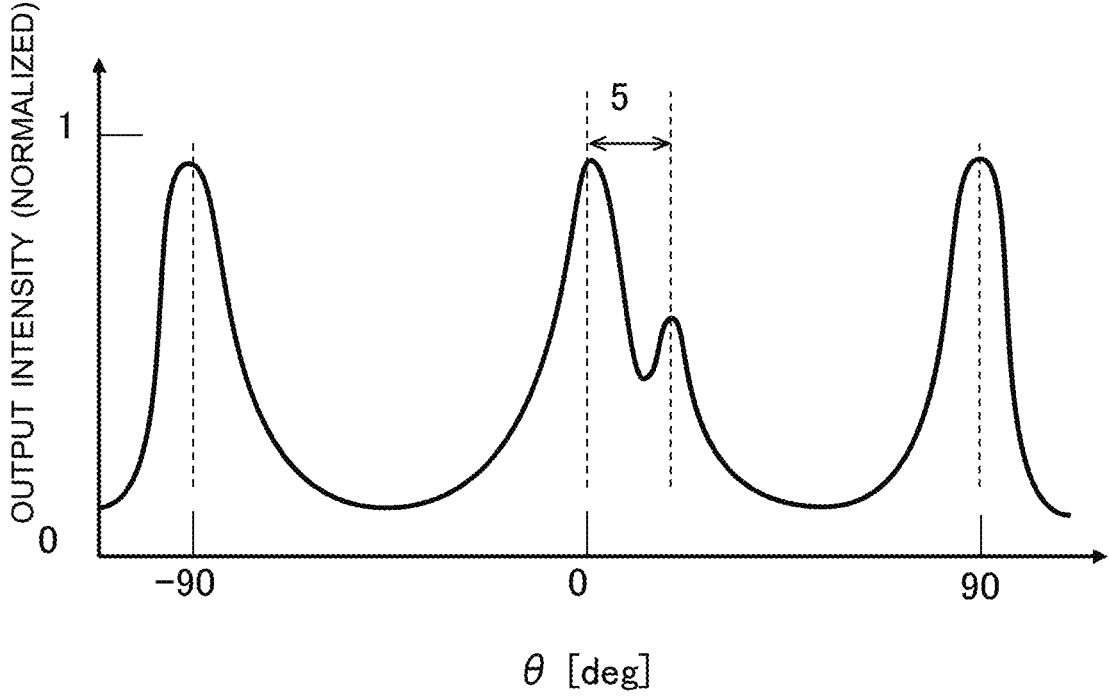
FIG. 12 is a graph showing output intensity with respect to a space angle after an integration process of the alignment direction detection device according to the first embodiment.

In step ST4 in FIG. 8, the computer 104 executes an integration process. In the step ST4, the computer 104 derives the intensity waveform with respect to each alignment angle θ by integrating each intensity value of the radial direction space frequency $f_R$ in regard to each alignment angle $\theta$. FIG. 12 is a graph showing the output intensity with respect to the alignment angle $\theta$ as the space angle after the integration process of the alignment direction detection device 11. FIG. 12 shows the result of executing the band limitation process and the integration process in the region (b) in FIG. 9.

In step ST5 in FIG. 8, the computer 104 executes an angle discrimination process. In the step ST5, the computer 104 derives the position of the alignment angle $\theta$ as the peak from the intensity waveform. Based on the derived value of the alignment angle $\theta$, it can be detected that the laminated body 1 of the electrically conductive composite materials in FIG. 2 is a laminated body of prepregs aligned in not only the 0° and 90° directions but also the 5° direction.

As described above, with the alignment direction detection device 11 according to the first embodiment, the alignment angle $\theta$ as the angle representing the alignment direction of fibers of the laminated body 1 including the electrically conductive composite materials can be quantitatively detected (i.e., measured).

Further, besides the carbon composite fiber shown in FIG. 2, the laminated body 1 of the electrically conductive composite materials may be formed with fiber cloths with metallic thin lines woven thereinto, silicon carbide (SiC) fiber or carbon composite fiber in ceramic-based composite materials, or an extrusion molding product using electrically conductive composite materials as base materials, and the alignment (angle) of fibers and the disturbance can be measured and discriminated in the same way as that for the laminated body 1 of the electrically conductive composite materials.

Second Embodiment

In the above-described first embodiment, the alignment direction of electrically conductive fibers is quantitatively detected by using the difference between the output voltages of the detection coils 41a and 41b differing in the distance from the laminated body 1 of the electrically conductive composite materials. In contrast, an alignment direction detection device according to a second embodiment quantitatively detects the alignment direction by using the difference between inductive magnetic fields from two laminated bodies having the same structure as each other (the laminated body as the test object and a laminated body as a comparison object).

Figure 13:
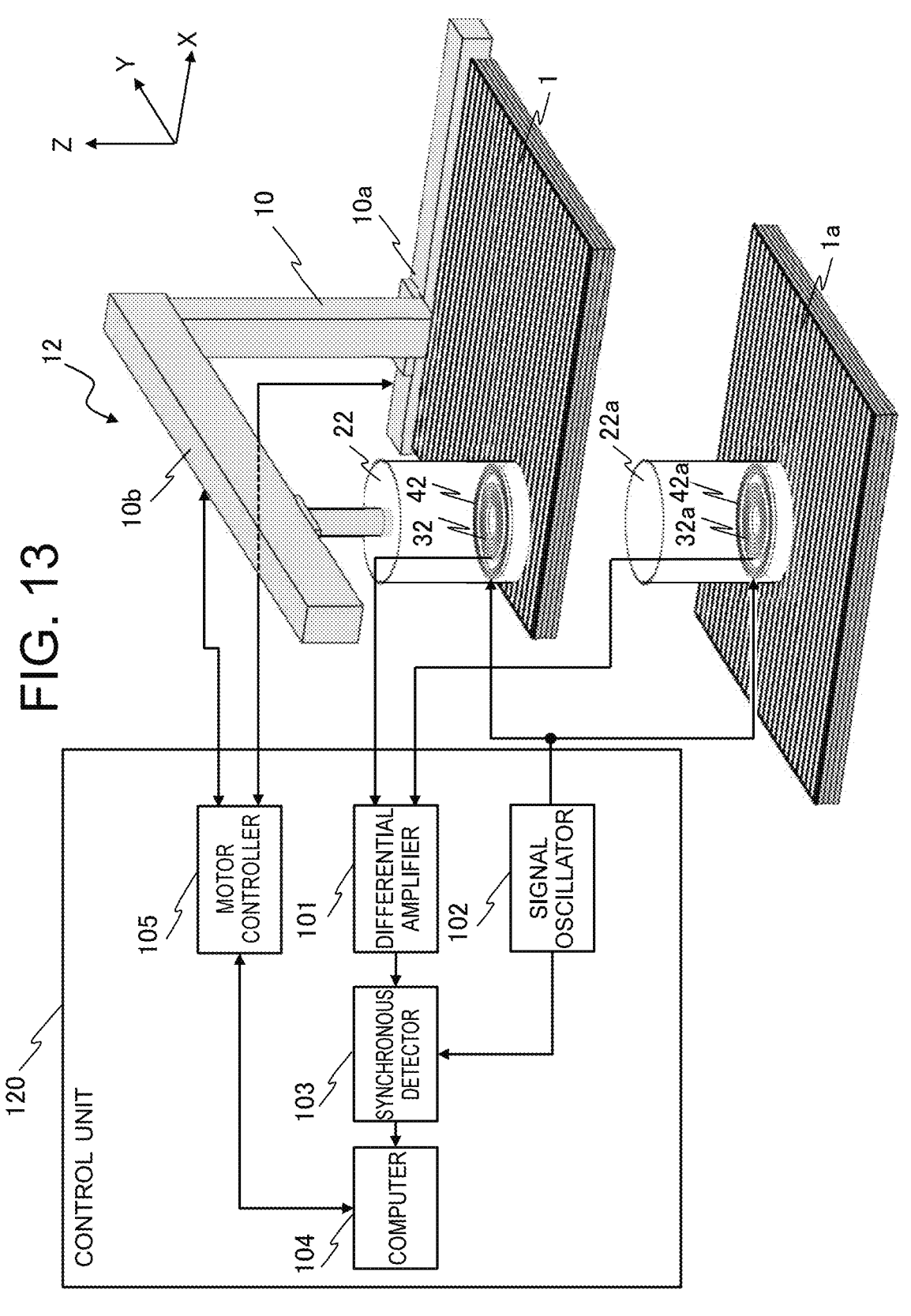
FIG. 13 is a diagram showing the configuration of an alignment direction detection device according to a second embodiment.

FIG. 13 is a diagram showing the configuration of the alignment direction detection device 12 according to the second embodiment. In FIG. 13, each component identical or corresponding to a component shown in FIG. 1 is assigned the same reference character as in FIG. 1. The alignment direction detection device 12 according to the second embodiment includes a probe 22 arranged to face the laminated body 1 as the test object and a comparison object probe 22a arranged to face a laminated body 1a as the comparison object having the same structure as the laminated body 1. While the laminated body 1a has the same structure as the laminated body 1 shown in FIGS. 2A and 2B, it is permissible even if only the layer $1_3$ is different and its alignment angle $\theta$ is not deviated by 5°. The probe 22 and the comparison object probe 22a have the same structure as each other. The probe 22 includes an excitation coil 32 and a detection coil 42 as a magnetic field sensor that are arranged coaxially. The comparison object probe 22a includes a comparison object excitation coil 32a and a detection coil 42a as a comparison object magnetic field sensor that are arranged coaxially.

For the measurement of the alignment direction of fibers, the comparison object probe 22a is arranged at a fixed position on the laminated body 1a as the comparison object, and the probe 22 is two-dimensionally scanned on the laminated body 1 as the test object in the X direction and the Y direction. The differential amplifier 101 of a control unit 120 outputs the difference between the output voltages of the detection coil 42 and the detection coil 42a for the comparison object. Thereafter, the alignment direction (i.e., the alignment angle) of fibers and the disturbance in the alignment direction are measured by the same signal processing as in the first embodiment. That is, the control unit 120 performs the band limitation on the distribution of the voltage outputted from the detection coil 42 based on the radial direction space frequency corresponding to the size of the detection coil 42 and the distance between the detection coil 42 and the test object (the steps ST1 to ST3 in FIG. 8), transforms the difference between the band-limited voltage distribution and the voltage outputted from the detection coil 42a for the comparison object (constant high-frequency voltage) into the output intensity waveform with respect to the space angle at the radial direction space frequency (the step ST4), and calculates the peak angle that is the peak position of the waveform as the alignment angle $\theta$ representing the alignment direction (the step ST5).

In the first embodiment, the difference between the output voltages of the detection coil 41a and the detection coil 41b differing in the distance from the laminated body 1 of the electrically conductive composite materials is acquired. That is, in the first embodiment, the difference between attenuation amounts of the inductive magnetic field due to the distance is acquired. In contrast, in the second embodiment, the difference between the inductive magnetic field from the laminated body 1 as the test object and the inductive magnetic field from the laminated body 1a as the comparison object is acquired. Therefore, by the second embodiment, the high-frequency signal deriving from the inductive magnetic field can be acquired with higher sensitivity (with a higher signal-to-noise ratio). Accordingly, the alignment (angle) of fibers and the disturbance can be measured more accurately.

Incidentally, when setting the laminated body 1 as the test object and the laminated body 1a as the comparison object on the alignment direction detection device 12, it is desirable to set the laminated bodies 1 and 1a while aligning the X direction and the Y direction of the laminated body 1a with those of the laminated body 1. However, it is not necessarily essential to make the directions of the laminated body 1 as the test object and the laminated body 1a as the comparison object coincide with each other when setting the laminated body 1 as the test object and the laminated body 1a as the comparison object.

Third Embodiment

Figure 14:
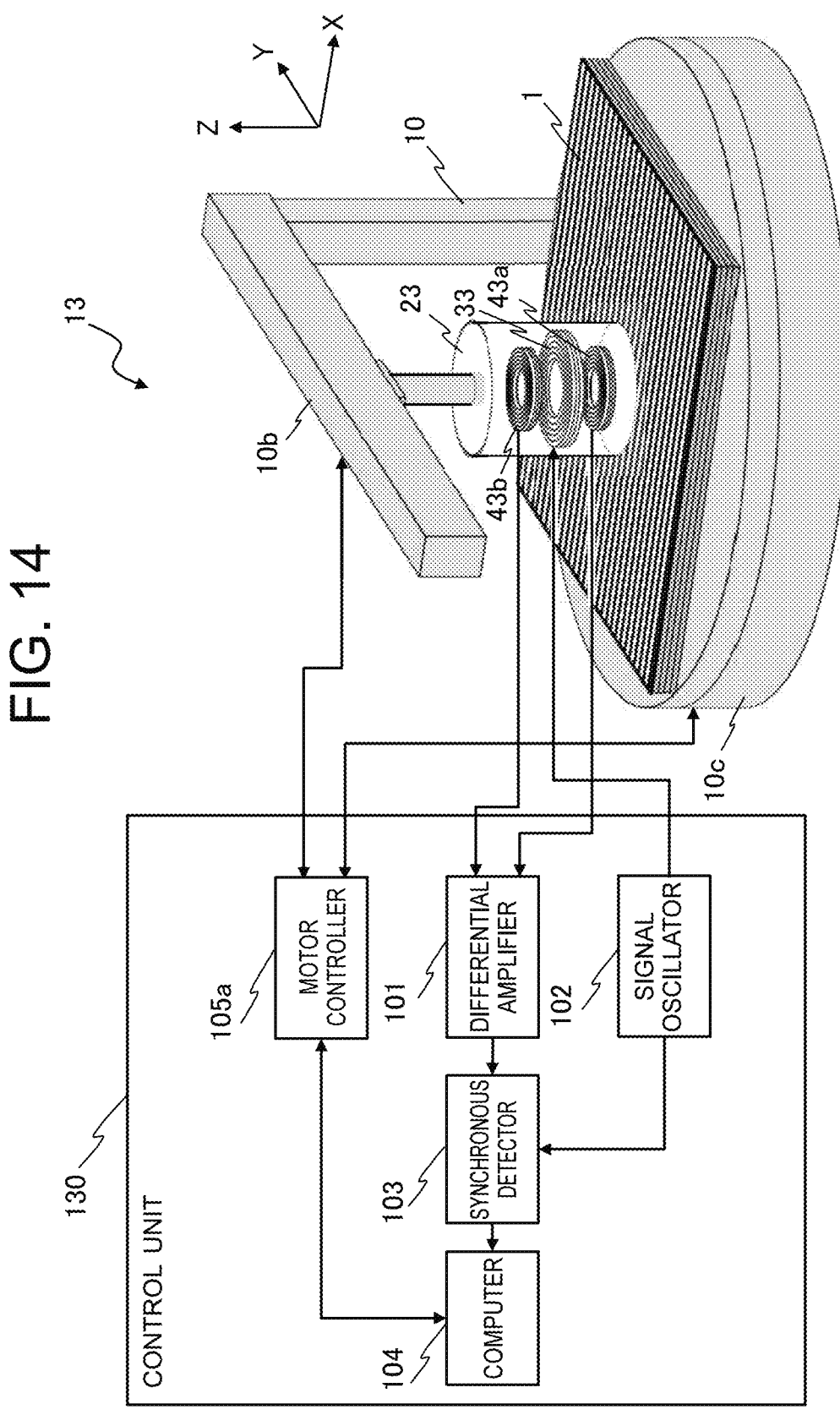
FIG. 14 is a diagram showing the configuration of an alignment direction detection device according to a third embodiment.

FIG. 14 is a diagram showing the configuration of an alignment direction detection device 13 according to a third embodiment. In FIG. 14, each component identical or corresponding to a component shown in FIG. 1 is assigned the same reference character as in FIG. 1. The alignment direction detection device 13 according to the third embodiment differs from the alignment direction detection device 11 according to the first embodiment in that the conveyance device 10 includes the Y direction conveyance unit 10b that moves a probe 23 in the Y direction and a rotational conveyance unit $10c$ that rotates the laminated body 1. That is, the conveyance device 10 of the alignment direction detection device 13 according to the third embodiment includes the Y direction conveyance unit $10b$ that linearly moves the probe 23 as the sensor unit in a direction parallel to the surface of the laminated body 1 as the test object and the rotational conveyance unit $10c$ that rotates the laminated body 1. The rotational conveyance unit $10c$ rotates the laminated body 1 around an axis extending in a direction in which the probe 23 and the laminated body 1 face each other. Further, the conveyance device 10 may include an X direction conveyance unit ($10a$ in FIG. 1) that linearly moves the probe 23 as the sensor unit in a direction parallel to the surface of the laminated body 1 as the test object instead of the Y direction conveyance unit $10b$. The probe 23 of the alignment direction detection device 13 is the same as the probe 21 shown in FIG. 1.

With the alignment direction detection device 13 according to the third embodiment, by scanning the laminated body 1 by rotating the laminated body 1 with the rotational conveyance unit $10c$ and moving the probe 23 in the Y direction with the Y direction conveyance unit $10b$, the high-frequency signal deriving from the inductive magnetic field can be acquired in the whole area of the laminated body 1 similarly to the case of the two-dimensional scan in FIG. 1. Accordingly, the alignment angle representing the alignment direction of fibers in the electrically conductive composite materials included in the laminated body 1 can be detected better. Further, the presence/absence and the position of the disturbance in the alignment direction of fibers in the electrically conductive composite materials can also be detected.

With the alignment direction detection device 13 according to the third embodiment, the acquired high-frequency signal represents the intensity distribution in a cylindrical coordinate system, and thus a control unit 130 can leave out the transformation work from the XY coordinate system to the cylindrical coordinate system in the procedure of detecting the alignment angle θ (the coordinate transformation process in the step ST2 in FIG. 8). Thus, the alignment angle representing the alignment direction of fibers in the electrically conductive composite materials included in the laminated body 1 can be detected in a shorter time with a lower-cost computer 104. Further, the presence/absence and the position of the disturbance in the alignment direction of fibers in the electrically conductive composite materials can also be detected.

Fourth Embodiment

Figure 16:
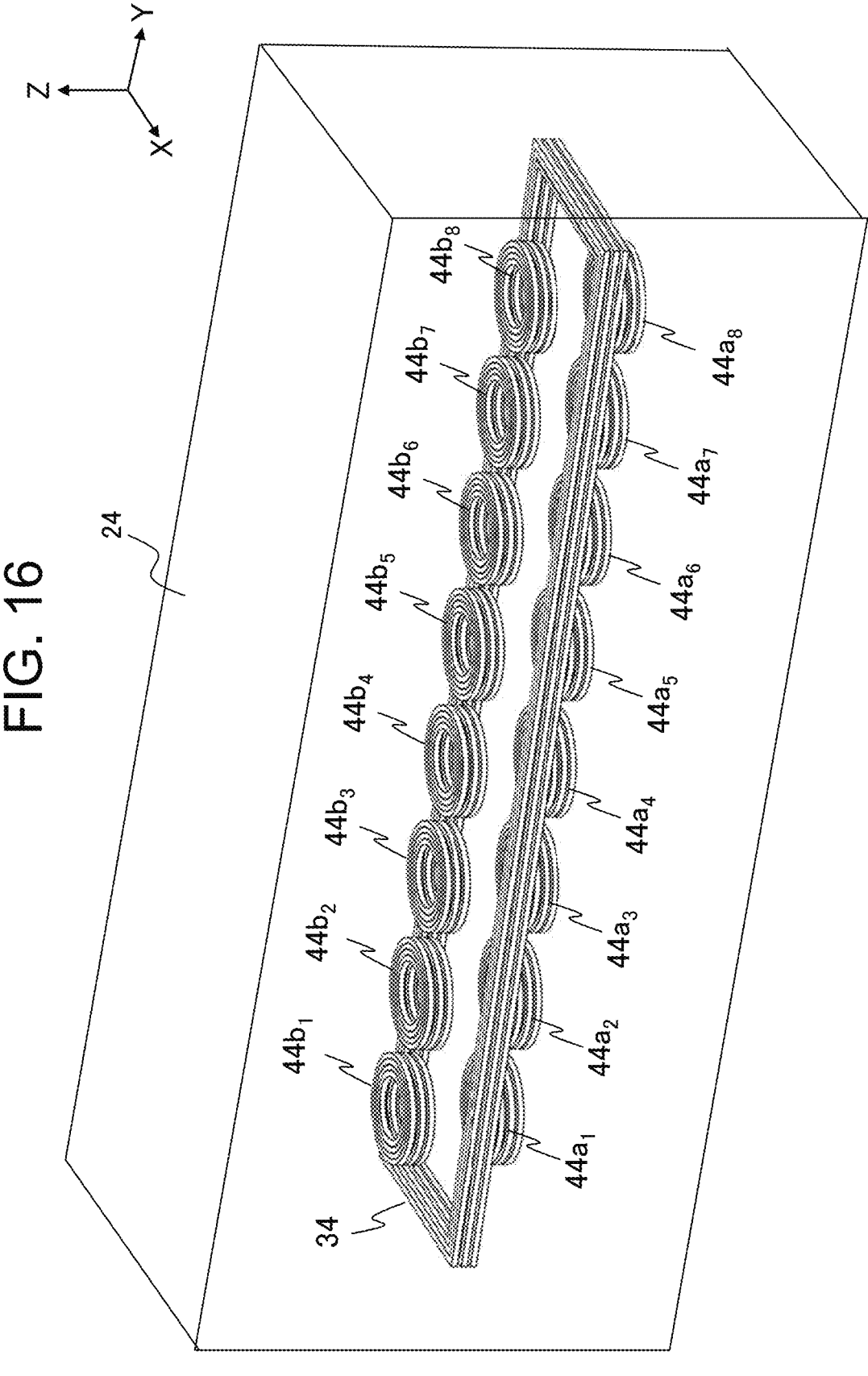
FIG. 16 is a perspective view schematically showing an excitation coil and detection coils in a probe of the alignment direction detection device according to the fourth embodiment.

FIG. 15 is a diagram showing the configuration of an alignment direction detection device 14 according to a fourth embodiment. In FIG. 15, each component identical or corresponding to a component shown in FIG. 1 is assigned the same reference character as in FIG. 1. FIG. 16 is a perspective view schematically showing an excitation coil 34 and detection coils $44a_1, \ldots, 44a_8, 44b_1, \ldots, 44b_8$ (represented also as detection coils 44) as magnetic field sensors in a probe 24 of the alignment direction detection device 14 according to the fourth embodiment.

The alignment direction detection device 14 according to the fourth embodiment differs from the alignment direction detection device 11 according to the first embodiment (FIG. 1) in that the probe 24 includes the excitation coil 34 wound in a rectangular shape, a plurality of detection coils (first magnetic field sensors) $44a_1, \ldots, 44a_8$ arranged in a predetermined array direction (the Y direction in the drawings), and a plurality of detection coils (second magnetic field sensors) $44b_1, \ldots, 44b_8$ arrayed in the same array direction (the Y direction in the drawings), and the probe 24 moves in the X direction and does not need to move in the Y direction. In the fourth embodiment, the conveyance device 10 includes the X direction conveyance unit $10a$ as a conveyance unit that linearly moves the probe 24 in a direction parallel to the surface of the laminated body 1 and orthogonal to the array direction. Except for these features, the configuration of the alignment direction detection device 14 according to the fourth embodiment is the same as that in the first embodiment.

As shown in FIG. 16, in the probe 24 of the alignment direction detection device 14 according to the fourth embodiment, the excitation coil 34, the plurality of detection coils $44a_1, \ldots, 44a_8$ arranged in the Y direction, and the plurality of detection coils $44b_1, \ldots, 44b_8$ arranged in the Y direction are arranged. The detection coils $44a_1, \ldots, 44a_8$ and the detection coils $44b_1, 44b_8$ include the same number of coils as each other and are arranged side by side to be in parallel with each other. The detection coils $44a_1, \ldots, 44a_8$ and the detection coils $44b_1, 44b_8$ are arranged inside the excitation coil 34. Further, each detection coil $44a_1, \ldots,$ $44a_8$ and each detection coil $44b_1, \ldots, 44b_8$ are arranged at the same position in regard to the X direction position and the Y direction position. Furthermore, in regard to the Z direction position, each detection coil $44a_1, \ldots, 44a_8$ and each detection coil $44b_1, \ldots, 44b_8$ are arranged at positions on opposite sides across the excitation coil 34 and at the same distance from the excitation coil 34. The plurality of detection coils $44a_1, \ldots, 44a_8$ are arranged at a position closer to the laminated body 1 compared to the plurality of detection coils $44b_1, \ldots, 44b_8$.

Incidentally, the number (or the number of pairs) of detection coils is not limited to the number shown in FIG. 16, that is, 16 (8 pairs). The number (or the number of pairs) of detection coils can also be a different number such as 10 (5 pairs), 12 (6 pairs), 18 (9 pairs) or 20 (10 pairs).

With the alignment direction detection device 14 according to the fourth embodiment, a control unit 140 is capable of acquiring the high-frequency signal deriving from the inductive magnetic field similarly to the case of the two-dimensional scan in FIG. 1 by scanning the laminated body 1 by having the X direction conveyance unit $10a$ move the probe 24 in the X direction. Thus, the alignment angle representing the alignment direction of fibers in the electrically conductive composite materials included in the laminated body 1 can be detected in a shorter time. Further, the presence/absence and the position of the disturbance in the alignment direction of fibers in the electrically conductive composite materials can also be detected.

Fifth Embodiment

Figure 17:
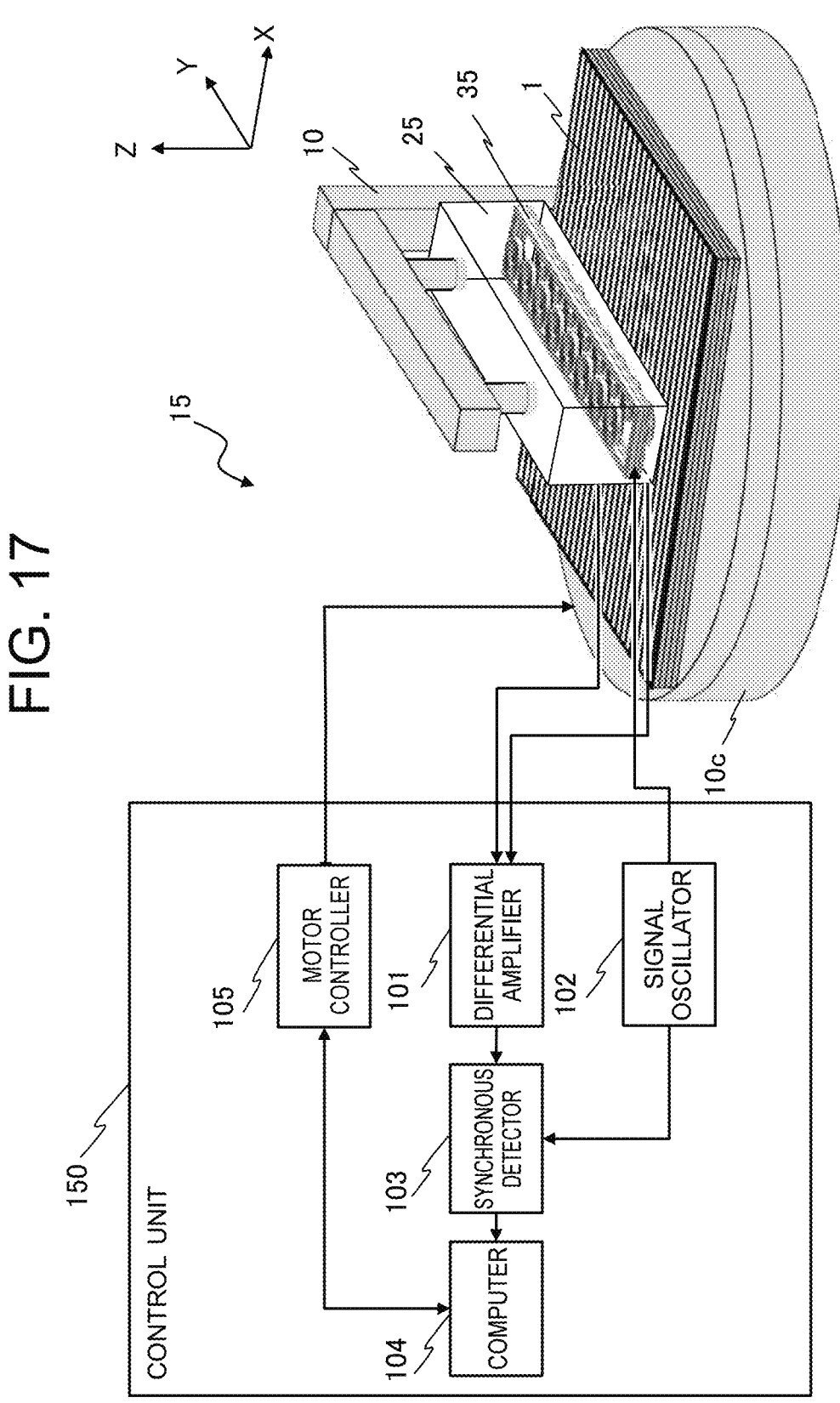
FIG. 17 is a diagram showing the configuration of an alignment direction detection device according to a fifth embodiment.

FIG. 17 is a diagram showing the configuration of an alignment direction detection device 15 according to a fifth embodiment. In FIG. 17, each component identical or corresponding to a component shown in FIG. 15 is assigned the same reference character as in FIG. 15. The alignment direction detection device 15 according to the fifth embodiment differs from the alignment direction detection device 14 according to the fourth embodiment which moves the laminated body 1 in the X direction in that the conveyance device 10 includes the rotational conveyance unit $10c$ that rotates the laminated body 1. A probe 25 of the alignment direction detection device 15 is the same as that shown in FIG. 15 and FIG. 16.

With the alignment direction detection device 15 according to the fifth embodiment, by scanning the laminated body 1 by rotating the laminated body 1 with the rotational conveyance unit 10c, the high-frequency signal deriving from the inductive magnetic field can be acquired similarly to the case of the two-dimensional scan in FIG. 1. Thus, the alignment angle representing the alignment direction of fibers in the electrically conductive composite materials included in the laminated body 1 can be detected in a shorter time. Further, the presence/absence and the position of the disturbance in the alignment direction of fibers in the electrically conductive composite materials can also be detected.

With the alignment direction detection device 15 according to the fifth embodiment, a control unit 150 is capable of acquiring the high-frequency signal deriving from the inductive magnetic field on a two-dimensional plane by only one scan by the rotational conveyance unit 10c by having the rotational conveyance unit 10c rotate the laminated body 1. With the alignment direction detection device 15, the acquired high-frequency signal represents the intensity distribution in a cylindrical coordinate system, and thus the transformation work from the XY coordinate system to the cylindrical coordinate system can be left out in the procedure of detecting the alignment angle θ (the coordinate transformation process in the step ST2 in FIG. 8). Thus, the alignment angle representing the alignment direction of fibers in the electrically conductive composite materials included in the laminated body 1 can be detected in a shorter time with a lower-cost computer 104. Further, the presence/absence and the position of the disturbance in the alignment direction of fibers in the electrically conductive composite materials can also be detected.

Sixth Embodiment

Figure 18:
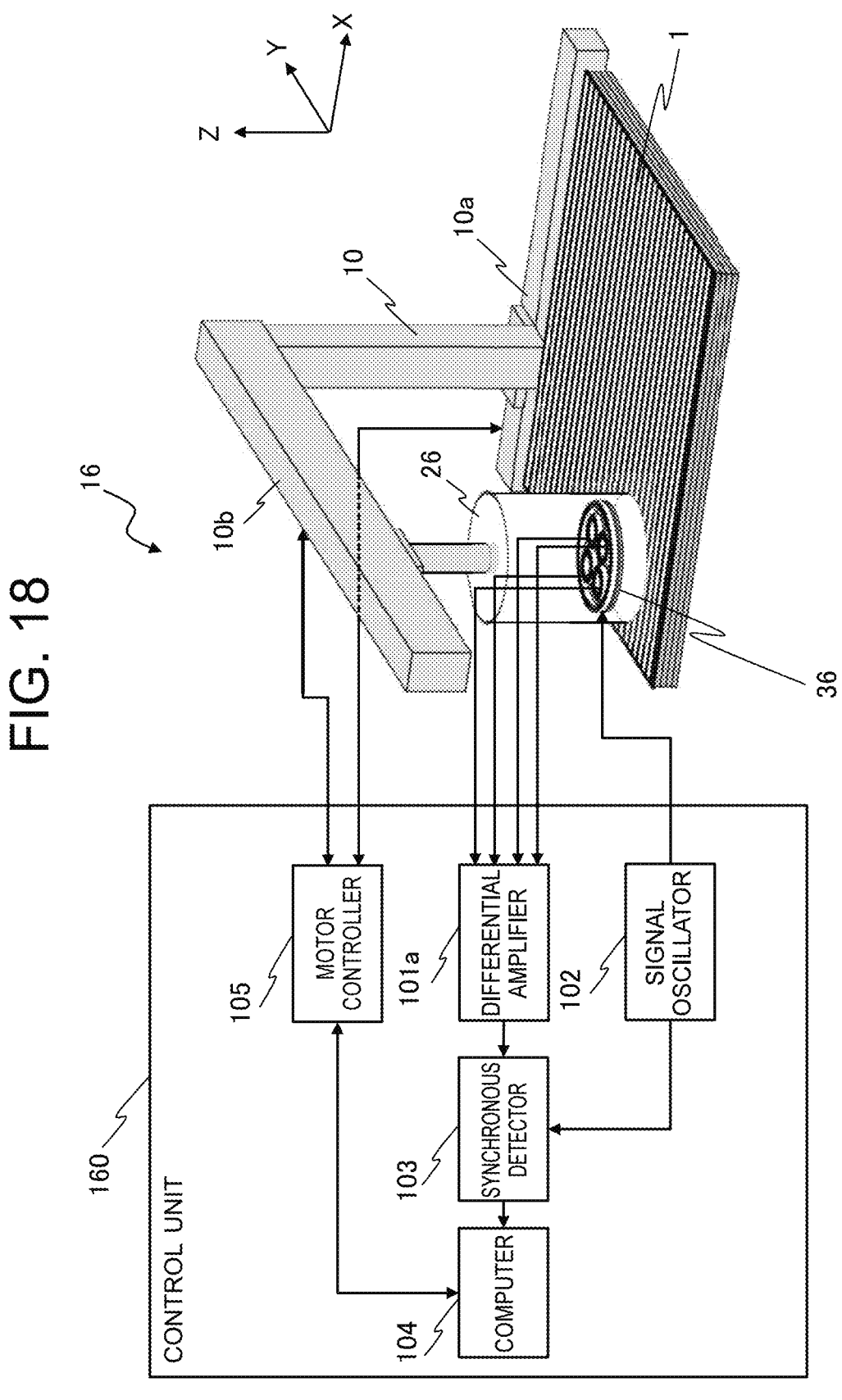
FIG. 18 is a diagram showing the configuration of an alignment direction detection device according to a sixth embodiment.
Figure 19:
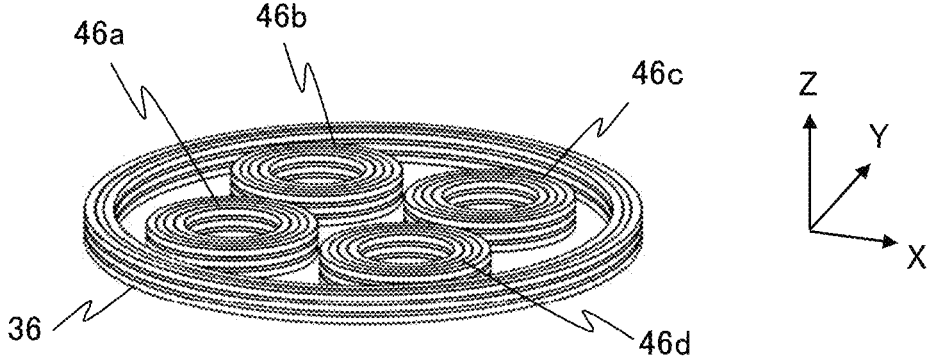
FIG. 19 is a perspective view schematically showing an excitation coil and detection coils in a probe of the alignment direction detection device according to the sixth embodiment.
Figure 20:
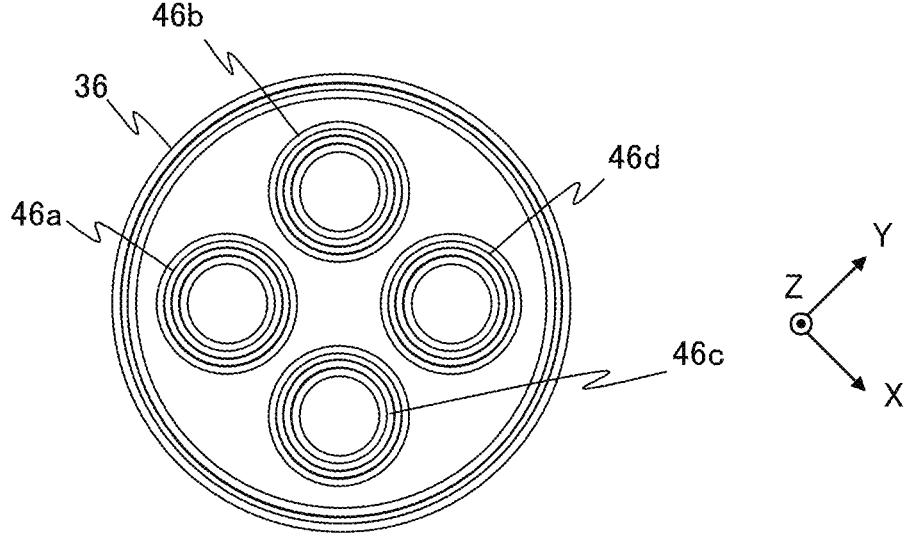
FIG. 20 is a top view schematically showing the excitation coil and the detection coils in the probe of the alignment direction detection device according to the sixth embodiment.

FIG. 18 is a diagram showing the configuration of an alignment direction detection device 16 according to a sixth embodiment. In FIG. 18, each component identical or corresponding to a component shown in FIG. 1 is assigned the same reference character as in FIG. 1. FIG. 19 and FIG. 20 are a perspective view and a top view schematically showing an excitation coil 36 and detection coils 46a to 46d in a probe 26 of the alignment direction detection device 16 according to the sixth embodiment.

The alignment direction detection device 16 according to the sixth embodiment differs from the alignment direction detection device 11 according to the first embodiment (FIG. 1) in that the probe 26 includes the excitation coil 36 and a plurality of detection coils 46a to 46d and in the arrangement of the excitation coil 36 and the plurality of detection coils 46a to 46d. Except for these features, the configuration of the alignment direction detection device 16 according to the sixth embodiment is the same as that in the first embodiment.

As shown in FIG. 19 and FIG. 20, in the probe 26 of the alignment direction detection device 16 according to the sixth embodiment, the excitation coil 36 and four detection coils (referred to also as "first to fourth magnetic field sensors") 46a to 46d arrayed in two rows and two columns are arranged. The detection coils 46a to 46d are arranged inside the excitation coil 36. Further, in regard to the Z direction position, the detection coils 46a to 46d are arranged at the same position as the excitation coil 36. That is, the distances from the laminated body 1 to the detection coils 46a to 46d are equal to each other.

The detection coil 46a and the detection coil 46d are arrayed in an array direction (e.g., the X direction), and the detection coil 46b and the detection coil 46c are arrayed in a crossing direction (e.g., the Y direction) crossing the array direction. The detection coils 46a to 46d are connected to a multi-input differential amplifier 101a, and the differential amplifier 101a is capable of outputting the difference between the output values of any two detection coils out of the detection coils 46a to 46d.

In a control unit 160, in cases of measuring the alignment angle and the disturbance in the alignment direction of fibers whose alignment direction is the X direction (θ=0°), the difference between the output voltages of the detection coil 46b and the detection coil 46c is acquired from the differential amplifier 101a. In cases of measuring the alignment angle and the disturbance in the alignment direction of fibers whose alignment direction is the Y direction (θ=90°), the difference between the output voltages of the detection coil 46a and the detection coil 46d is acquired from the differential amplifier 101a. Further, in cases of measuring the alignment angle and the disturbance in the alignment direction of fibers whose alignment direction is an intermediate direction (θ=45°) between the X direction and the Y direction, the difference between the output voltages of the detection coil 46a and the detection coil 46c or the detection coil 46b and the detection coil 46d is acquired from the differential amplifier 101a. In cases of measuring the alignment angle and the disturbance in the alignment direction of fibers whose alignment direction is an intermediate direction (θ=−45°) between the −X direction and the Y direction, the difference between the output voltages of the detection coil 46a and the detection coil 46b or the difference between the output voltages of the detection coil 46c and the detection coil 46d is acquired from the differential amplifier 101a.

In the sixth embodiment, the alignment (angle) and the disturbance of fibers can be discriminated with higher accuracy by measuring the alignment (angle) and the disturbance of fibers at every 45° (a range of −90° to −77.5° at θ=−90°, a range of −77.5° to −22.5° at θ=−45°, a range of −22.5° to 22.5° at θ=0°, a range of 22.5° to 77.5° at θ=45°, and a range of 77.5° to 90° at θ=90°) based on the high-frequency signals deriving from the inductive magnetic field acquired as above.

Seventh Embodiment

Figure 21:
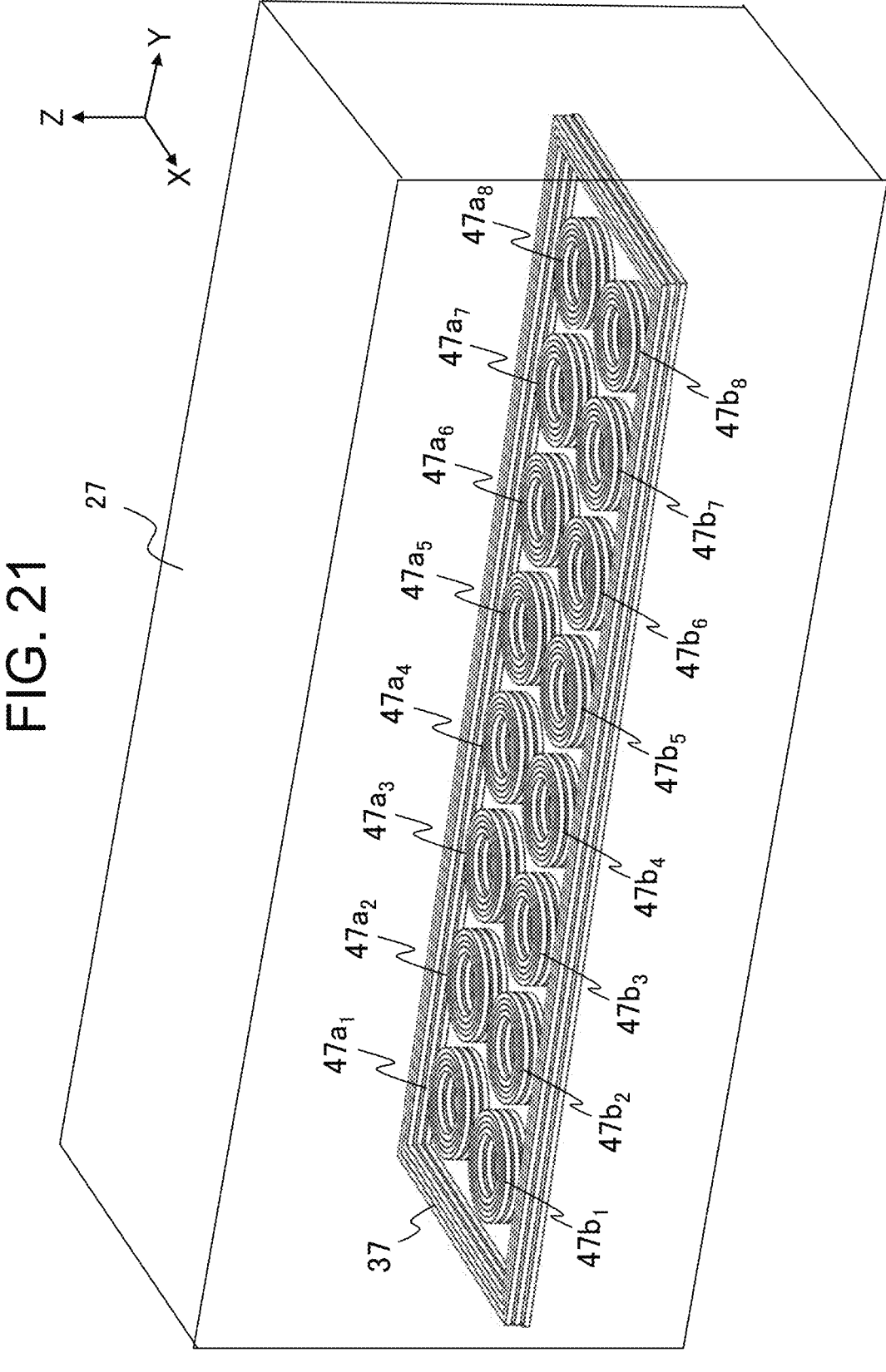
FIG. 21 is a perspective view schematically showing an excitation coil and detection coils in a probe of an alignment direction detection device according to a seventh embodiment.

FIG. 21 is a perspective view schematically showing an excitation coil 37 and detection coils $47a_1, \ldots, 47a_8$, $47b_1, \ldots, 47b_8$ (represented also as detection coils 47) as magnetic field sensors in a probe 27 of an alignment direction detection device according to a seventh embodiment. The alignment direction detection device according to the seventh embodiment differs from the alignment direction detection device 14 according to the fourth embodiment (FIG. 15) in the arrangement of the excitation coil 37 and a plurality of detection coils $47a_1, \ldots, 47a_8, 47b_1, \ldots, 47b_8$ provided in the probe 27. Except for this feature, the configuration of the alignment direction detection device according to the seventh embodiment is the same as that in the fourth embodiment.

As shown in FIG. 21, in the probe 27 of the alignment direction detection device according to the seventh embodiment, the excitation coil 37, a plurality of detection coils $47a_1, \ldots, 47a_8$ arrayed in a predetermined array direction (the Y direction in FIG. 21), and a plurality of detection coils $47b_1, \ldots, 47b_8$ arrayed in the same array direction (the Y direction in FIG. 21) are arranged. The detection coils $47a_1, \ldots, 47a_8$ and the detection coils $47b_1, \ldots, 47b_8$ are arranged side by side with each other. The detection coils $47a_1, \ldots, 47a_8$ and the detection coils $47b_1, \ldots, 47b_8$ are arranged inside the excitation coil 37. Further, in regard to the Z direction position, the excitation coil 37 and the detection coils $47a_1, \ldots, 47a_8, 47b_1, \ldots, 47b_8$ are arranged at the same position. That is, the distance from the laminated body 1 to the detection coils $47a_1, \ldots, 47a_8$ is equal to the distance from the laminated body 1 to the detection coils $47b_1, \ldots, 47b_8$.

Incidentally, the number (or the number of pairs) of detection coils is not limited to the number shown in FIG. 21, that is, 16 (8 pairs). The number (or the number of pairs) of detection coils can also be a different number such as 10 (5 pairs), 12 (6 pairs), 18 (9 pairs) or 20 (10 pairs).

With the alignment direction detection device according to the seventh embodiment, the high-frequency signal deriving from the inductive magnetic field can be acquired similarly to the case of the two-dimensional scan in FIG. 1 by scanning the laminated body 1 by having the X direction conveyance unit 10a move the probe 27 in the X direction. Thus, the alignment angle representing the alignment direction of fibers in the electrically conductive composite materials included in the laminated body 1 can be detected in a shorter time. Further, the presence/absence and the position of the disturbance in the alignment direction of fibers in the electrically conductive composite materials can also be detected.

Incidentally, the probe 27 of the alignment direction detection device according to the seventh embodiment may also be used instead of the probe 25 of the alignment direction detection device 15 according to the fifth embodiment (FIG. 17).

Modification

While examples in which two linear movement directions of the conveyance device 10 are directions orthogonal to each other (i.e., the X direction and the Y direction) have been described in the above embodiments, the angle formed by the two linear movement directions of the conveyance device 10 is not limited to 90°.

DESCRIPTION OF REFERENCE CHARACTERS

1: laminated body of electrically conductive composite materials (test object), 1a: laminated body of electrically conductive composite materials (comparison object), 10: conveyance device, 10a: X direction conveyance unit, $10b_8$: Y direction conveyance unit, 10c: rotational conveyance unit, 11-16: alignment direction detection device, 21-27: probe (sensor unit), 22a: comparison object probe, 31-37, 32a: excitation coil, 41a, 41b, 42, 43a, 43b, 44, $44a_1$-$44a_8$, $44b_1$-$44b_8$, 46a-46d, 47, $47a_1$-$47a_8$, $47b_1$-$47b_8$: detection coil (magnetic field sensor), 110, 120, 130, 140, 150, 160: control unit, 101: differential amplifier, 101a: differential amplifier, 102: signal oscillator, 103: synchronous detector, 104: computer, 105: motor controller, ST1: offset removal process, ST2: coordinate transformation process, ST3: band limitation process, ST4: integration process, ST5: angle discrimination process.

What is claimed is:

1. An alignment direction detection device that detects an alignment direction of fibers in a test object including one or more sheets of electrically conductive composite materials each containing electrically conductive fibers, comprising:

an excitation coil to apply an AC magnetic field to the test object;

one or more magnetic field sensors arranged at positions maintaining a fixed positional relationship with the excitation coil, each of which detects an inductive magnetic field caused by the AC magnetic field and outputs voltage corresponding to the inductive magnetic field;

a conveyance device to move at least one of the test object and a sensor unit including the excitation coil and the one or more magnetic field sensors; and processing circuitry to control the excitation coil, the one or more magnetic field sensors, and the conveyance device, wherein the processing circuitry calculates a radial direction space frequency as a function of (i) a size of the magnetic field sensor and (ii) a distance between the magnetic field sensor and the test object, performs a band limitation on a distribution of the voltage outputted from each magnetic field sensor included in the one or more magnetic field sensors based on the calculated radial direction space frequency, transforms the band-limited voltage distribution into an output intensity waveform with respect to a space angle at the radial direction space frequency, and calculates a peak angle that is a peak position of the output intensity waveform as an alignment angle representing the alignment direction.

2. The alignment direction detection device according to claim 1, wherein the test object is a laminated body including a plurality of electrically conductive composite materials.

3. The alignment direction detection device according to claim 1, wherein the one or more magnetic field sensors include a first magnetic field sensor and a second magnetic field sensor, the excitation coil, the first magnetic field sensor, and the second magnetic field sensor are arranged coaxially, and the first magnetic field sensor is arranged at a position closer to the test object compared to the second magnetic field sensor.

4. The alignment direction detection device according to claim 3, wherein the first magnetic field sensor is arranged at a position closer to the test object compared to the excitation coil, and the second magnetic field sensor is arranged at a position farther from the test object compared to the excitation coil.

5. The alignment direction detection device according to claim 3, wherein the first magnetic field sensor and the second magnetic field sensor are arranged inside the excitation coil.

6. The alignment direction detection device according to claim 3, wherein the excitation coil includes a first excitation coil and a second excitation coil arranged at a position farther from the test object compared to the first excitation coil, the first magnetic field sensor is arranged inside the first excitation coil, and the second magnetic field sensor is arranged inside the second excitation coil.

7. The alignment direction detection device according to claim 1, further comprising:

a comparison object excitation coil that has a same structure as the excitation coil and applies an AC magnetic field to a comparison object having a same structure as the test object; and a comparison object magnetic field sensor that has a same structure as the one or more magnetic field sensors and outputs voltage corresponding to an inductive magnetic field caused by the comparison object excitation coil, wherein the processing circuitry transforms a difference between the band-limited voltage distribution and the voltage outputted from the comparison object magnetic field sensor into the output intensity waveform with respect to the space angle at the radial direction space frequency.

8. The alignment direction detection device according to claim 1, wherein the one or more magnetic field sensors include first to fourth magnetic field sensors arrayed in two rows and two columns, and distances from the test object to the first to fourth magnetic field sensors are equal to each other.

9. The alignment direction detection device according to claim 1, wherein the conveyance device includes:

a first conveyance unit to move the sensor unit in a first direction parallel to a surface of the test object; and a second conveyance unit to move the sensor unit in a second direction parallel to the surface of the test object and crossing the first direction.

10. The alignment direction detection device according to claim 1, wherein the conveyance device includes:

a conveyance unit to linearly move the sensor unit in a direction parallel to a surface of the test object; and a rotational conveyance unit to rotate the test object.

11. The alignment direction detection device according to claim 1, wherein the one or more magnetic field sensors include:

a plurality of first magnetic field sensors arrayed in a predetermined array direction; and a plurality of second magnetic field sensors arrayed in the array direction and including a same number of magnetic field sensors as the plurality of first magnetic field sensors, and the plurality of first magnetic field sensors are arranged at a position closer to the test object compared to the plurality of second magnetic field sensors.

12. The alignment direction detection device according to claim 1, wherein the one or more magnetic field sensors include:

a plurality of first magnetic field sensors arrayed in a predetermined array direction; and a plurality of second magnetic field sensors arrayed in the array direction and including a same number of magnetic field sensors as the plurality of first magnetic field sensors, and a distance from the test object to the plurality of first magnetic field sensors is equal to a distance from the test object to the plurality of second magnetic field sensors.

13. The alignment direction detection device according to claim 11, wherein the conveyance device includes a conveyance unit to linearly move the sensor unit in a direction parallel to a surface of the test object and orthogonal to the array direction.

14. The alignment direction detection device according to claim 11, wherein the conveyance device includes a rotational conveyance unit to rotate the test object.

15. The alignment direction detection device according to claim 2, wherein the one or more magnetic field sensors include one or more detection coils, and the processing circuitry sets a passband in the band limitation at a band of the radial direction space frequency that is proportional to a sum of (i) the size of each detection coil included in the one or more detection coils and (ii) the distance between the detection coil and the test object.

16. The alignment direction detection device according to claim 15, wherein the size of the detection coil is a diameter or a short side length.

17. The alignment direction detection device according to claim 15, wherein the detection coil includes a differential coil that outputs a difference between voltage outputs of two coils having a same structure.

18. The alignment direction detection device according to claim 1, wherein the processing circuitry uses the Radon transform as signal processing to transform the band-limited voltage distribution into the output intensity waveform.

19. The alignment direction detection device according to claim 1, wherein the magnetic field sensor includes at least one of a detection coil, a magnetoresistance element sensor, a magnetic impedance sensor, a Hall sensor, a flux gate sensor, a magnetooptic sensor, an optical pumping atomic magnetic sensor, or a superconducting quantum interference device.

20. The alignment direction detection device according to claim 1, wherein the fibers are carbon fibers, metallic thin lines, or silicon carbide fibers.

* * * * *